United States Patent
Gordon et al.

(10) Patent No.: US 11,403,649 B2
(45) Date of Patent: *Aug. 2, 2022

(54) MULTICHANNEL SYSTEM FOR PATRON IDENTIFICATION AND DYNAMIC ORDERING EXPERIENCE ENHANCEMENT

(71) Applicant: Toast, Inc., Boston, MA (US)

(72) Inventors: Benjamin Gordon, Scituate, MA (US); Ting-Ray Kuo, Newton, MA (US); Jared J. Rand, West Roxbury, MA (US)

(73) Assignee: Toast, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,255

(22) Filed: Sep. 11, 2019

(65) Prior Publication Data

US 2021/0073831 A1 Mar. 11, 2021

(51) Int. Cl.
*G06Q 30/02* (2012.01)
*G06N 5/04* (2006.01)

(52) U.S. Cl.
CPC .......... *G06Q 30/0201* (2013.01); *G06N 5/04* (2013.01)

(58) Field of Classification Search
None
See application file for complete search history.

(56) References Cited

U.S. PATENT DOCUMENTS 6,298,348 B1 10/2001 Eldering
6,912,540 B2 6/2005 Kohut et al.
(Continued)

FOREIGN PATENT DOCUMENTS

CA 3034086 A1 8/2019
CN 107430728 A 12/2017
(Continued)

OTHER PUBLICATIONS

Amazon Go, Wikipedia, archives org, Aug. 28, 2019 https://web.archive.org/web/20190828223306/https://en.wikipedia.org/wiki/Amazon_Go (Year: 2019).*

*Primary Examiner* — Octavian Rotaru
(74) *Attorney, Agent, or Firm* — Richard K. Huffman; Huffman Patent Group, LLC

(57) ABSTRACT

A method for increasing a transaction amount corresponding a patron of an establishment, the method including: receiving inputs comprising transaction data corresponding to a transaction, where a portion of the transaction data comprises personally identifiable information (PII), and extracting the PII from the portion of the transaction data, and employing the PII to generate PII transaction data and metadata corresponding to the transaction; analyzing the PII transaction data and the metadata to generate a single universal guest record (UGR) corresponding to the PII transaction data and the metadata, where the single UGR corresponds to the patron, the single UGR comprising UGR transaction metadata corresponding to the transaction and historical transactions associated with the patron; statistically analyzing the UGR metadata to generate a guest segmentation record that corresponds to the patron; and generating content for display on point-of-sale (POS) terminals associated with the establishment, where the content is directed toward increasing an amount of the transaction.

18 Claims, 10 Drawing Sheets

(56) References Cited

U.S. PATENT DOCUMENTS

| | | |
|---|---|---|
| 8,175,908 B1 | 5/2012 | Anderson |
| 8,517,256 B2 | 8/2013 | Stone et al. |
| 8,626,705 B2 | 1/2014 | Barrett et al. |
| 8,719,193 B1 | 5/2014 | Marianne Lannace |
| 8,799,053 B1 | 8/2014 | Goldberg |
| 8,930,204 B1 | 1/2015 | Igoe et al. |
| 9,009,067 B1 | 4/2015 | Scotto et al. |
| 9,031,867 B1 | 5/2015 | Crawford |
| 9,123,054 B1 | 9/2015 | Villars et al. |
| 9,129,118 B1 | 9/2015 | Johansson et al. |
| 9,298,900 B2 | 3/2016 | Davis et al. |
| 9,818,093 B1 | 11/2017 | Grier |
| 10,062,082 B2 | 8/2018 | Unser et al. |
| 10,074,141 B2 | 9/2018 | Unser et al. |
| 10,079,683 B1* | 9/2018 | Chebaro ............... H04L 63/06 |
| 10,091,230 B1 | 10/2018 | Machani et al. |
| 10,140,372 B2 | 11/2018 | Popp et al. |
| 10,242,104 B2 | 3/2019 | Hussey, Jr. et al. |
| 10,290,016 B1 | 5/2019 | Rose |
| 10,311,459 B1 | 6/2019 | Babao et al. |
| 10,325,250 B2 | 6/2019 | Pugh et al. |
| 10,366,434 B1 | 7/2019 | Belousova et al. |
| 10,509,949 B1 | 12/2019 | Mossoba et al. |
| 10,616,782 B2 | 4/2020 | Manolarakis et al. |
| 10,832,299 B1 | 11/2020 | Clauss et al. |
| 10,839,003 B2 | 11/2020 | Chan et al. |
| 2002/0016740 A1 | 2/2002 | Ogasawara |
| 2002/0107732 A1 | 8/2002 | Boies et al. |
| 2003/0065595 A1 | 4/2003 | Anglum |
| 2003/0115126 A1 | 6/2003 | Pitroda |
| 2003/0149781 A1 | 8/2003 | Yared et al. |
| 2004/0034537 A1 | 2/2004 | Gengarella et al. |
| 2004/0034570 A1 | 2/2004 | Davis |
| 2004/0128196 A1 | 7/2004 | Shibuno |
| 2004/0143496 A1 | 7/2004 | Saenz |
| 2004/0162781 A1 | 8/2004 | Searl et al. |
| 2005/0054438 A1 | 3/2005 | Rothschild et al. |
| 2005/0131759 A1 | 6/2005 | Agrawal et al. |
| 2005/0165643 A1 | 7/2005 | Wilson et al. |
| 2005/0177449 A1 | 8/2005 | Temares et al. |
| 2005/0189415 A1 | 9/2005 | Fano et al. |
| 2006/0065716 A1 | 3/2006 | Peters |
| 2006/0111977 A1 | 5/2006 | Hawkins |
| 2006/0143079 A1 | 6/2006 | Basak et al. |
| 2006/0178892 A1 | 8/2006 | Oon |
| 2006/0242011 A1 | 10/2006 | Bell et al. |
| 2007/0192122 A1 | 8/2007 | Routson et al. |
| 2007/0255615 A1 | 11/2007 | Lavoie et al. |
| 2007/0271194 A1* | 11/2007 | Walker ................ G06Q 30/02 705/80 |
| 2008/0010151 A1 | 1/2008 | Bridges et al. |
| 2008/0154654 A1 | 6/2008 | Niessen et al. |
| 2008/0183588 A1 | 7/2008 | Agrawal et al. |
| 2008/0195472 A1 | 8/2008 | Shandelman et al. |
| 2008/0249864 A1 | 10/2008 | Angell et al. |
| 2009/0048917 A1 | 2/2009 | Blake et al. |
| 2009/0132347 A1 | 5/2009 | Anderson et al. |
| 2009/0132395 A1 | 5/2009 | Lam et al. |
| 2009/0142031 A1* | 6/2009 | Godtland ............... G11B 27/28 386/278 |
| 2009/0150210 A1* | 6/2009 | Athsani ............. G06Q 30/0201 705/7.29 |
| 2009/0182630 A1* | 7/2009 | Otto .................... G06Q 20/206 705/14.1 |
| 2009/0234708 A1 | 9/2009 | Heiser, II et al. |
| 2009/0287562 A1 | 11/2009 | Bosch et al. |
| 2009/0328173 A1 | 12/2009 | Jakobson et al. |
| 2010/0030644 A1 | 2/2010 | Dhamodharan |
| 2010/0036884 A1 | 2/2010 | Brown |
| 2010/0042517 A1 | 2/2010 | Paintin et al. |
| 2010/0063843 A1 | 3/2010 | Kenedy et al. |
| 2010/0169340 A1 | 7/2010 | Kenedy et al. |
| 2010/0169342 A1 | 7/2010 | Kenedy et al. |
| 2010/0169343 A1 | 7/2010 | Kenedy et al. |
| 2010/0281020 A1 | 11/2010 | Drubner |
| 2010/0301113 A1* | 12/2010 | Bohn ................... G06Q 30/02 235/380 |
| 2011/0035278 A1 | 2/2011 | Fordyce, III et al. |
| 2011/0040609 A1 | 2/2011 | Hawkins et al. |
| 2011/0093327 A1 | 4/2011 | Fordyce, III et al. |
| 2011/0099202 A1 | 4/2011 | Dedeoglu et al. |
| 2011/0112897 A1 | 5/2011 | Tietzen et al. |
| 2011/0119122 A1 | 5/2011 | Padam et al. |
| 2011/0153339 A1 | 6/2011 | Buck et al. |
| 2011/0231225 A1 | 9/2011 | Winters |
| 2011/0238538 A1 | 9/2011 | Allison, Jr. et al. |
| 2011/0264567 A1 | 10/2011 | Clyne |
| 2011/0302016 A1 | 12/2011 | Haddad |
| 2012/0084135 A1 | 4/2012 | Nissan et al. |
| 2012/0095822 A1* | 4/2012 | Chiocchi ............ G06Q 30/0225 705/14.26 |
| 2012/0166270 A1 | 6/2012 | Coppinger |
| 2012/0179559 A1 | 7/2012 | Rogers et al. |
| 2012/0323663 A1 | 12/2012 | Leach |
| 2013/0013404 A1 | 1/2013 | Suprock et al. |
| 2013/0036001 A1 | 2/2013 | Wegner et al. |
| 2013/0036119 A1 | 2/2013 | Yakout et al. |
| 2013/0041837 A1 | 2/2013 | Dempski et al. |
| 2013/0054433 A1 | 2/2013 | Giard et al. |
| 2013/0073405 A1 | 3/2013 | Ariyibi |
| 2013/0103578 A1 | 4/2013 | Mallean et al. |
| 2013/0110604 A1 | 5/2013 | Rooke et al. |
| 2013/0124287 A1 | 5/2013 | Bjorn et al. |
| 2013/0124315 A1 | 5/2013 | Doughty et al. |
| 2013/0124330 A1 | 5/2013 | Doughty et al. |
| 2013/0138492 A1 | 5/2013 | Delgado et al. |
| 2013/0159224 A1 | 6/2013 | Blake et al. |
| 2013/0185196 A1 | 7/2013 | Kadur et al. |
| 2013/0191223 A1 | 7/2013 | Harris et al. |
| 2013/0204886 A1 | 8/2013 | Faith et al. |
| 2013/0218991 A1 | 8/2013 | McConnell et al. |
| 2013/0226857 A1* | 8/2013 | Shim .................... H04W 4/021 706/52 |
| 2013/0238408 A1 | 9/2013 | Cooke et al. |
| 2013/0246125 A1 | 9/2013 | DiGioacchino et al. |
| 2013/0275229 A1 | 10/2013 | Moganti et al. |
| 2013/0282468 A1 | 10/2013 | Michael |
| 2013/0304661 A1 | 11/2013 | Umamaheswaran et al. |
| 2013/0311266 A1 | 11/2013 | Vichich et al. |
| 2013/0317886 A1 | 11/2013 | Kiran et al. |
| 2013/0317993 A1 | 11/2013 | Wasserman et al. |
| 2013/0325626 A1 | 12/2013 | Morgan et al. |
| 2013/0325640 A1 | 12/2013 | Morgan et al. |
| 2013/0325641 A1 | 12/2013 | Brown et al. |
| 2013/0325681 A1 | 12/2013 | Somashekar et al. |
| 2013/0326009 A1 | 12/2013 | Morgan et al. |
| 2013/0332344 A1 | 12/2013 | Weber |
| 2013/0332451 A1 | 12/2013 | Camplejohn et al. |
| 2013/0339238 A1 | 12/2013 | Unland et al. |
| 2014/0006293 A1* | 1/2014 | Chang ............... G06Q 30/0202 705/304 |
| 2014/0012739 A1 | 1/2014 | Wall et al. |
| 2014/0081733 A1 | 3/2014 | Morris et al. |
| 2014/0164125 A1 | 6/2014 | Hammock et al. |
| 2014/0164088 A1 | 6/2014 | Rorabaugh |
| 2014/0180790 A1* | 6/2014 | Boal ................... G06Q 40/10 705/14.42 |
| 2014/0201043 A1 | 7/2014 | Arditi et al. |
| 2014/0207518 A1 | 7/2014 | Kannan et al. |
| 2014/0222559 A1 | 8/2014 | Caglayan et al. |
| 2014/0246487 A1* | 9/2014 | Mihara ................ G06K 7/1413 235/375 |
| 2014/0279044 A1 | 9/2014 | Summers et al. |
| 2014/0324524 A1 | 10/2014 | Ray et al. |
| 2014/0337140 A1 | 11/2014 | Caldwell |
| 2014/0358666 A1 | 12/2014 | Baghaie |
| 2014/0365384 A1 | 12/2014 | Mowatt et al. |
| 2015/0019547 A1 | 1/2015 | Thalapathy et al. |
| 2015/0025936 A1 | 1/2015 | Garel et al. |
| 2015/0039390 A1 | 2/2015 | Hu et al. |
| 2015/0039443 A1 | 2/2015 | Soon-Shiong |
| 2015/0052098 A1 | 2/2015 | Kveton et al. |
| 2015/0073954 A1 | 3/2015 | Braff |
| 2015/0081423 A1 | 3/2015 | Palan et al. |

(56) References Cited

U.S. PATENT DOCUMENTS

| | | |
|---|---|---|
| 2015/0081437 A1 | 3/2015 | Mehra et al. |
| 2015/0081565 A1 | 3/2015 | Roullier et al. |
| 2015/0112864 A1 | 4/2015 | Wallaja et al. |
| 2015/0142686 A1 | 5/2015 | Baldwin et al. |
| 2015/0149253 A1 | 5/2015 | Unser et al. |
| 2015/0170252 A1 | 6/2015 | Koo Tze Mew |
| 2015/0181384 A1 | 6/2015 | Mayor et al. |
| 2015/0193715 A1 | 7/2015 | Bernath et al. |
| 2015/0199645 A1 | 7/2015 | Sulur et al. |
| 2015/0220924 A1 | 8/2015 | Bakker |
| 2015/0220937 A1 | 8/2015 | Lannace et al. |
| 2015/0235240 A1 | 8/2015 | Chang et al. |
| 2015/0242911 A1 | 8/2015 | Zises |
| 2015/0244654 A1* | 8/2015 | Tsubota ............ H04L 51/32 709/206 |
| 2015/0248696 A1 | 9/2015 | Fernandez |
| 2015/0269600 A1 | 9/2015 | Randle |
| 2015/0278928 A1 | 10/2015 | Nichols et al. |
| 2015/0310059 A1 | 10/2015 | Assam |
| 2015/0310460 A1 | 10/2015 | Tesanovic et al. |
| 2015/0324810 A1 | 11/2015 | Vincent et al. |
| 2015/0332303 A1 | 11/2015 | Kodali |
| 2015/0347624 A1 | 12/2015 | Villars |
| 2015/0356660 A1 | 12/2015 | L'Heureux et al. |
| 2015/0356668 A1 | 12/2015 | L'Heureux et al. |
| 2015/0363698 A1* | 12/2015 | Kritt ............ G06Q 30/0255 706/11 |
| 2016/0019629 A1 | 1/2016 | Briancon et al. |
| 2016/0034713 A1 | 2/2016 | Ramirez |
| 2016/0055499 A1 | 2/2016 | Hawkins et al. |
| 2016/0063511 A1 | 3/2016 | Ben-Eliezer et al. |
| 2016/0078453 A1 | 3/2016 | Agrawal et al. |
| 2016/0092580 A1* | 3/2016 | Komeili ............ G06Q 10/10 707/722 |
| 2016/0127289 A1 | 5/2016 | Papa et al. |
| 2016/0133140 A1 | 5/2016 | King et al. |
| 2016/0142272 A1 | 5/2016 | Stringham |
| 2016/0162870 A1 | 6/2016 | Henson et al. |
| 2016/0203522 A1 | 7/2016 | Shiffert et al. |
| 2016/0210682 A1 | 7/2016 | Kannan et al. |
| 2016/0227359 A1 | 8/2016 | Hurewitz et al. |
| 2016/0232566 A1* | 8/2016 | Bonalle ............ G06Q 30/0255 |
| 2016/0239853 A1 | 8/2016 | Cummins et al. |
| 2016/0292698 A1 | 10/2016 | Piotrowski et al. |
| 2016/0292700 A1 | 10/2016 | Gopal et al. |
| 2016/0321565 A1 | 11/2016 | Mendoza et al. |
| 2016/0321633 A1 | 11/2016 | Chandrasekaran et al. |
| 2016/0321661 A1 | 11/2016 | Hammond et al. |
| 2016/0328728 A1 | 11/2016 | Khvostov et al. |
| 2016/0364743 A1 | 12/2016 | St. Lawrence et al. |
| 2016/0379241 A1 | 12/2016 | Badger et al. |
| 2017/0011425 A1 | 1/2017 | Proctor, Jr. et al. |
| 2017/0032404 A1 | 2/2017 | Sembrat et al. |
| 2017/0053281 A1 | 2/2017 | Howe et al. |
| 2017/0083916 A1 | 3/2017 | Fadli |
| 2017/0124169 A1 | 5/2017 | Ullrich et al. |
| 2017/0124595 A1 | 5/2017 | Costache et al. |
| 2017/0132607 A1 | 5/2017 | Lee et al. |
| 2017/0132681 A1 | 5/2017 | Modi et al. |
| 2017/0140174 A1 | 5/2017 | Lacey et al. |
| 2017/0177798 A1 | 6/2017 | Samuel et al. |
| 2017/0191839 A1 | 7/2017 | Mysen |
| 2017/0200192 A1 | 7/2017 | DeAngelo et al. |
| 2017/0214758 A1 | 7/2017 | Engel |
| 2017/0221131 A1* | 8/2017 | Sullivan ............ G06Q 30/0635 |
| 2017/0243188 A1 | 8/2017 | Mahmoudzadehvazifeh et al. |
| 2017/0243267 A1 | 8/2017 | Lamberton |
| 2017/0270544 A1 | 9/2017 | Jaidka et al. |
| 2017/0278201 A1 | 9/2017 | Mimassi |
| 2017/0286992 A1 | 10/2017 | Lounsbury, Jr. et al. |
| 2017/0308972 A1 | 10/2017 | Atkins et al. |
| 2017/0316433 A1 | 11/2017 | Revanur et al. |
| 2017/0316434 A1 | 11/2017 | Revanur |
| 2017/0337602 A1 | 11/2017 | Davis |
| 2018/0018689 A1 | 1/2018 | Becker et al. |
| 2018/0033027 A1 | 2/2018 | Ganesh et al. |
| 2018/0040059 A1 | 2/2018 | Cruz et al. |
| 2018/0046623 A1 | 2/2018 | Faith et al. |
| 2018/0060411 A1 | 3/2018 | Kanuri et al. |
| 2018/0060954 A1 | 3/2018 | Yin et al. |
| 2018/0063110 A1 | 3/2018 | Kiryazov et al. |
| 2018/0101887 A1 | 4/2018 | Akkiraju et al. |
| 2018/0130033 A1 | 5/2018 | Aaron et al. |
| 2018/0130091 A1 | 5/2018 | Rae |
| 2018/0139569 A1 | 5/2018 | Padgett et al. |
| 2018/0181951 A1 | 6/2018 | Goldfinger et al. |
| 2018/0182044 A1 | 6/2018 | Lannace et al. |
| 2018/0192364 A1 | 7/2018 | Campos et al. |
| 2018/0218173 A1 | 8/2018 | Perkins et al. |
| 2018/0232536 A1 | 8/2018 | Fineman et al. |
| 2018/0247283 A1 | 8/2018 | Milici et al. |
| 2018/0276710 A1* | 9/2018 | Tietzen ............ G06Q 30/0269 |
| 2018/0276769 A1* | 9/2018 | Mizon ............ G06Q 20/00 |
| 2018/0286000 A1 | 10/2018 | Berry, Jr. et al. |
| 2018/0365715 A1 | 12/2018 | Malhotra et al. |
| 2019/0034808 A1 | 1/2019 | Palanichamy |
| 2019/0066138 A1 | 2/2019 | Rapperport et al. |
| 2019/0095601 A1 | 3/2019 | Chan et al. |
| 2019/0102795 A1 | 4/2019 | Shapiro et al. |
| 2019/0108566 A1 | 4/2019 | Coleman et al. |
| 2019/0114689 A1 | 4/2019 | Wang et al. |
| 2019/0130453 A1 | 5/2019 | Sasapu |
| 2019/0130479 A1 | 5/2019 | Sweeney |
| 2019/0147708 A1 | 5/2019 | Monaco et al. |
| 2019/0164205 A1 | 5/2019 | Agrawal et al. |
| 2019/0180310 A1 | 6/2019 | Jones |
| 2019/0228461 A1 | 7/2019 | Domokos et al. |
| 2019/0236597 A1 | 8/2019 | Huang et al. |
| 2019/0266289 A1 | 8/2019 | Bartholomew |
| 2019/0325468 A1 | 10/2019 | Nagarajan |
| 2019/0392220 A1 | 12/2019 | Maan et al. |
| 2020/0026710 A1 | 1/2020 | Przada et al. |
| 2020/0042828 A1 | 2/2020 | Silberman et al. |
| 2020/0051095 A1* | 2/2020 | Kumar ............ G06V 40/173 |
| 2020/0051112 A1 | 2/2020 | Nelsen et al. |
| 2020/0065881 A1 | 2/2020 | Truong et al. |
| 2020/0068031 A1 | 2/2020 | Kursun et al. |
| 2020/0126125 A1 | 4/2020 | Sanjay et al. |
| 2020/0134420 A1* | 4/2020 | Spooner ............ G06F 16/907 |
| 2020/0134656 A1 | 4/2020 | Padmanabhan |
| 2020/0134695 A1 | 4/2020 | Avlani et al. |
| 2020/0145436 A1 | 5/2020 | Brown et al. |
| 2020/0311746 A1 | 10/2020 | Parida et al. |

FOREIGN PATENT DOCUMENTS

| | | |
|---|---|---|
| TW | I607413 B | 12/2017 |
| WO | WO2016209006 A1 | 12/2016 |

* cited by examiner

PRESENT DAY SINGLE CHANNEL PATRON IDENTIFICATION PROCESS

*EXEMPLARY ENRICHED UNIVERSAL GUEST RECORD*

*EXEMPLARY GUEST SEGMENTATION RECORD*

*EXEMPLARY SOCIAL GRAPH RECORD*

EXEMPLARY GUEST RETENTION OFFERS DISPLAY

MULTICHANNEL SYSTEM FOR PATRON IDENTIFICATION AND DYNAMIC ORDERING EXPERIENCE ENHANCEMENT

CROSS-REFERENCE TO RELATED APPLICATIONS

This application is related to the following co-pending U.S. Patent Applications, each of which has a common assignee and common inventors, the entireties of which are herein incorporated by reference.

| Ser. No. | FILING DATE | TITLE |
| --- | --- | --- |
| 16/567,199 | Sep. 11, 2019 | MULTICHANNEL APPARATUS AND METHOD FOR PATRON IDENTIFICATION |
| 16/567,234 | Sep. 11, 2019 | SEGMENTATION OF MULTICHANNEL GENERATED PATRON IDENTIFIERS |
| 16/567,279 | Sep. 11, 2019 | MULTICHANNEL SYSTEM FOR PATRON IDENTIFICATION AND RETENTION |

BACKGROUND OF THE INVENTION

Field of the Invention

This invention relates in general to the field of retail establishment management, and more particularly to a multichannel apparatus and method for patron identification.

Description of the Related Art

Retail establishments have been employing marketing and retention strategies since the beginning of recorded history. People are the same generally; the only difference between then and now are the technologies that are employed to more accurately identify patrons and to more effectively engage those patrons with offers geared toward increased sales and patron loyalty.

Fifty years ago, patrons were typically solicited with offers for increased sales based upon age, gender, inferred social class, and handwritten purchase histories. Well-known patrons were provided with more effective offers for upsell and guest retention than those who were lesser known. As the use of credit cards increased, retail chains having revolving lines of credit (e.g., Sears, Texaco, etc.) were able to more accurately associate patrons with purchases, and thus patron engagement techniques were developed that exhibited an increased probability of increasing sales and customer loyalty.

Shortly thereafter, general lines of credit (e.g., MasterCard®, Visa®, American Express®, etc.) were introduced that allowed patrons to employ a single form of payment by credit rather than being forced to use a credit card unique to a retail chain. As one skilled in the art will appreciate, though chain-specific credit cards are still in existence, the overwhelming majority of the public uses one or more of the general credit lines to pay for purchases. In fact, with the advent of debit cards provided by these general payment networks, most patrons have shifted to exclusive use of general credit/debit cards for purchases rather than cash or check. Consequently, some stores and chains are now advertising policies that do not provide for cash payments.

Regarding the development of guest engagement techniques, the use of general credit/debit cards has resulted in a substantial step forward because not only are a patron's purchases at a single retail establishment or chain known to a vendor, but that patron's complete set of purchases using a credit/debit cards can be known, though without direct public identification of the patron. However, absent directly identifying a customer, retailers can purchase analytical data from the credit networks that show tastes and spending habits of categories of patrons, which may be employed to generate even more effective mechanisms to increase sales and retain loyalty.

The above techniques are merely representative of those presently employed to identify and engage patrons, and the present inventors have noted a long-felt need in the art for techniques and mechanisms to perfect identification and engagement of patrons for, as one skilled in the art will appreciate, patrons do not always behave like their corresponding age, gender, or inferred social class. Rather, patrons are individuals and it is well known that the most effective means for engaging someone and retaining their loyalty can be had from knowing them personally, as unique individuals, and furthermore analyzing not only their purchases at one retail establishment, but their purchases at a substantial number of retail establishments. Thus, those in the art today devote significant resources on developing techniques that are directed toward combining any form of personally identifiable information (PII) such as, but not limited to, last name, gender, phone number, email address, etc. that can be obtained to narrow a number of patrons down to individual patrons, for by doing so a patron's purchase history may be analyzed to develop their tastes and purchase inclinations.

Yet, privacy laws and practices preclude public association of customer names with their account numbers, so the quest continues to develop more accurate and robust techniques for combining PII and for developing taste and spending profiles for patrons.

Therefore, what is needed is an apparatus that employs a patron's purchase data across a substantial number of retail establishments to precisely identify the patron, to develop that patron's taste and spending profile, and to proffer offers directed toward increasing sales to the patron and retaining the patron's loyalty.

What is also needed is an apparatus and method for employing information taken from multiple input channels to a point-of-sale (POS) subscriber system, and for combining this multichannel information to precisely identify the patron, to develop that patron's taste and spending profile, and to proffer offers directed toward increasing sales to the patron and retaining the patron's loyalty.

What is additionally needed is a point-of-sale subscription system that automatically extracts and combines personally identifiable information from more than a single input channel to yield a single universal guest record that accurately identifies a single patron and that determines that patron's tastes, spending habits, and purchase inclinations across a substantial number of retail establishments.

SUMMARY OF THE INVENTION

The present invention, among other applications, is directed to solving the above-noted problems and addresses other problems, disadvantages, and limitations of the prior art by providing vastly improved techniques for identifying, categorizing, and targeting patrons for purposes of promoting increased sales and loyalty. In one embodiment, an apparatus for increasing a transaction amount corresponding to a patron of an establishment is provided. The apparatus includes a guest inference processor and a patron engagement processor. The guest inference processor is configured to receive inputs comprising transaction data corresponding to a transaction, where a portion of the transaction data comprises personally identifiable information (PII), and is configured to extract the PII from the portion of the transaction data, and is configured to employ the PII to generate PII transaction data and metadata corresponding to the transaction, and configured to analyze the PII transaction data and the metadata to generate a single universal guest record (UGR) corresponding to the PII transaction data and the metadata, where the single UGR corresponds to the patron, the single UGR comprising UGR transaction metadata corresponding to the transaction and historical transactions associated with the patron, and is configured to statistically analyze the UGR metadata to generate a guest segmentation record that corresponds to the patron. The patron engagement processor is configured receive the guest segmentation record, and is configured to generate content for display on point-of-sale (POS) terminals associated with the establishment, where the content is directed toward increasing an amount of the transaction.

One aspect of the present invention comprehends an apparatus for increasing a transaction amount corresponding to a patron of an establishment. Th apparatus has a backend server that is part of a point-of-sale (POS) system. Th backend server includes: a guest inference processor, configured to receive inputs comprising transaction data corresponding to a transaction, where a portion of the transaction data comprises personally identifiable information (PII), and configured to extract the PII from the portion of the transaction data, and configured to employ the PII to generate PII transaction data and metadata corresponding to the transaction, and configured to analyze the PII transaction data and the metadata to generate a single universal guest record (UGR) corresponding to the PII transaction data and the metadata, where the single UGR corresponds to the patron, the single UGR comprising UGR transaction metadata corresponding to the transaction and historical transactions associated with the patron, and configured to statistically analyze the UGR metadata to generate a guest segmentation record that corresponds to the patron; and a patron engagement processor, configured receive the guest segmentation record, and configured to generate content for display on POS terminals associated with the establishment, where the content is directed toward increasing an amount of the transaction.

Another aspect of the present invention contemplates a method for increasing a transaction amount corresponding a patron of an establishment, the method including: receiving inputs comprising transaction data corresponding to a transaction, where a portion of the transaction data comprises personally identifiable information (PII), and extracting the PII from the portion of the transaction data, and employing the PII to generate PII transaction data and metadata corresponding to the transaction; analyzing the PII transaction data and the metadata to generate a single universal guest record (UGR) corresponding to the PII transaction data and the metadata, where the single UGR corresponds to the patron, the single UGR comprising UGR transaction metadata corresponding to the transaction and historical transactions associated with the patron; statistically analyzing the UGR metadata to generate a guest segmentation record that corresponds to the patron; and generating content for display on point-of-sale (POS) terminals associated with the establishment, where the content is directed toward increasing an amount of the transaction.

BRIEF DESCRIPTION OF THE DRAWINGS

These and other objects, features, and advantages of the present invention will become better understood with regard to the following description, and accompanying drawings where.

DETAILED DESCRIPTION

Figure 1:
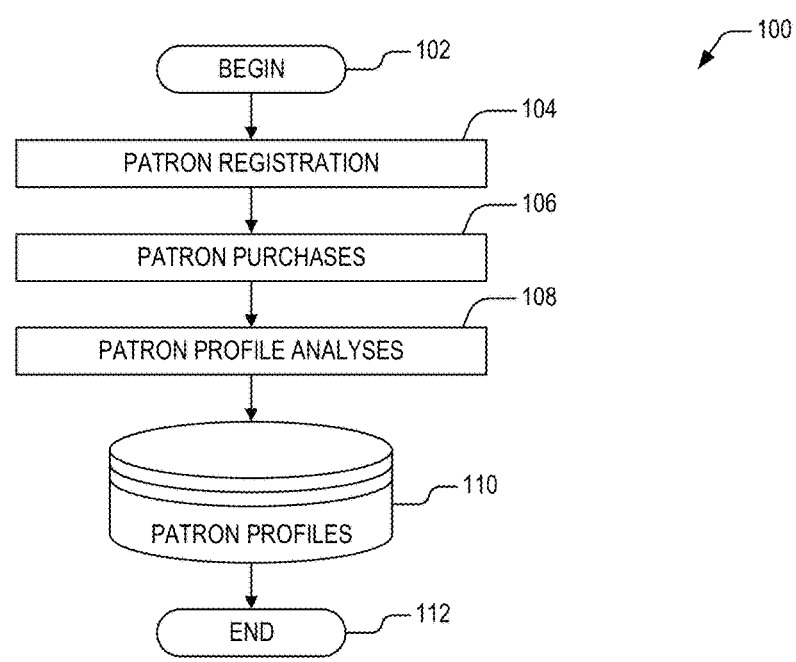
FIG. 1 is a flow diagram illustrating a present-day single channel patron identification process.

Exemplary and illustrative embodiments of the invention are described below. It should be understood at the outset that, although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application," "application," "application program," "app," "computer program," or "program") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Multi-Core Processor: Also known as a multi-core microprocessor, a multi-core processor is a microprocessor having multiple CPUs ("cores") fabricated on a single integrated circuit.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

In view of the above background discussion on retail establishment management and associated techniques presently employed for purposes of identifying, engaging, and retaining customers, a discussion of the limitations and disadvantages of such techniques will now be presented with reference to FIG. 1. Following this, a discussion of the present invention will be presented with reference to FIGS. 2-14.

Turning to FIG. 1, a flow diagram is presented illustrating a present-day single channel patron identification process 100. Flow begins at block 102 where a patron of a retail establishment desires to purchase goods and/or services. As one skilled in the art will appreciate, it is entirely possible for the patron to remain completely anonymous by placing an order and paying for the order with cash, check, or a credit card for, as one skilled in the art will appreciate, retail establishments are precluded from publicly associating patron names with their credit card account numbers. Because of this anonymity, retail establishment staff are forced to employ broad and often ineffective strategies to increase check/receipt size. This is particularly evident in so-called quick-serve restaurants where staff members generally ask patrons if they would like to upgrade to a "super-sized" meal or "combo" meal and because there is no evidence supporting a patron's long-term value (i.e., whether this is the patron's first purchase or their 100th purchase), customer retention strategies typically are proffered in the form of sales and general discounts to the public at large.

In more recent years, establishments have invested resources toward more definitively identifying patrons, their purchase habits, and their purchase histories because in doing so strategies for upselling, cross-selling, and retention exhibiting higher probabilities of success may be employed. To identify a patron, however, requires that one or more consistent pieces of personally identifiable information (PII) be obtained and referenced by establishments. As one skilled in the art will appreciate, PII is not particularly constrained to patron names. In fact, for many applications, a patron's phone number or email address will suffice as consistent PII.

For example, in block 104, such PII may be obtained and stored for later use when a patron registers with a retail establishment by providing his/her name, phone number, email address, or some other form of identification. The patron may provide this PII in person, over the phone, or by entering it into a website or mobile application. As one skilled in the art will appreciate, many people are registered with more than 50 retail establishments in order to purchase goods and services and to secure targeted discounts. Retail businesses strongly encourage registration because all subsequent purchases through a business may be correlated with the stored PII and analyzed for purposes of upselling, cross-selling, and customer retention.

At block 106, the registered patron makes purchases through the particular business with which he/she is registered. Consider that the business may be a grocery store, a big box store (e.g., Amazon, Walmart, etc.), a restaurant, a hotel, an airline, a 3rd party delivery service (e.g., Uber Eats, Caviar), or a simple credit card (e.g., MasterCard, Amex, etc.). Accordingly, each time the patron makes a purchase with that business, the purchase is recorded. The business is thus provided with the items ordered, the date and time or order, the check total, etc., and all of this data is stored and associated with the patron's PII.

At block 108, the business may perform statistical and other forms of analyses on the purchases associated with the PII in order to produce a patron profile that is indicative of the patron's tastes, timing, spending habits, and predispositions. It is not a purpose of this disclosure to provide an in-depth tutorial of the types, degrees, and extents of these analyses; however, as one skilled in the art will appreciate, businesses pervasively and effectively employ these patron profiles to increase sales, retain customers, and promote brand loyalty. Anyone who has ever registered with a grocery store loyalty program would acknowledge that weekly digital coupon offers displayed on the store's website are specifically tailored to comport with that person's tastes, timing, spending habits, and predispositions.

At block 110, patron profiles are stored and iteratively revised 1) for later use by the particular business or 2) for sale to other businesses. For example, a credit card company may sell its cardholders' profiles to other businesses that employ those profiles for targeted marketing and direct sales. A website portal may employ a registered patron's profile of purchases (or clicked upon content links) for targeted marketing and direct sales. A big box portal may employ a patron's profile for upselling and increased sales. A third-party delivery service may employ a patron's profile by manipulating digital content for the very same purposes. Flow then proceeds to block 112, where the method ends.

Patron profiles are extremely valuable, particularly for businesses that make or break on basis points in sales. Thus, information that can be obtained and analyzed for a particular patron will result in increasingly successful and profitable targeted strategies that may be applied. Buried in the bowels of a Facebook user's settings are hundreds of profile category values that are employed to manipulate content for that user every day. Information is the key to increasing sales, promoting loyalty, and retaining customers. Information that is more reliable, more detailed, and broader in range is more valuable to a business than information of lesser reliability, lesser detail, and narrow range.

Accordingly, the present inventors have noted a long-felt desire in the art for improved techniques and processes for increasing the amount and reliability of purchase data for individual consumers, and for mechanisms to accurately correlate purchase data with the individual consumers. Accordingly, the present inventors have observed that there are several problems in the state of the art that preclude achievement of the above-noted objectives. For example, present-day techniques for associating one or more pieces of PII may not point to a single consumer, but rather may indicate two or more consumers, such as when partners or roommates share a loyalty account that is registered under a single name, physical address, phone number, or email address. Similarly, joint and/or business credit card accounts may indicate a primary account holder rather than a single user. Consequently, two or more patron's purchase histories may be combined to yield an entirely different and perhaps misleading profile than that which could be had otherwise. Thus, a business is constrained to employ this combined profile to perform upsell, cross-sell, and retention functions.

Another problem that has been observed is that present-day techniques for obtaining PII and analyzing purchases is that the data obtained are overwhelmingly gathered through a single source (or, "channel"). For instance, a particular grocery store chain may know a consumer's purchase history, but the resulting profile is only indicative of that consumer's tastes, timing, spending habits, and predispositions when shopping at one or the stores in that chain. The consumer may have entirely different tastes, timing, spending habits, and predispositions when shopping at another store that is not in the chain. In this instance, the channel for correlating purchase history with PII is the consumer's loyalty card. If a third-party delivery service is employed to make purchases, those purchases do not get associated with that consumer unless the consumer provides loyalty PII to the service. Additionally, PII gathered from one channel may be quite different from PII gathered from another channel and would thus requires special processing to transform PII from both channels into a single patron profile.

Another example of single-channel mechanisms for creating consumer profiles is that employed by credit card companies. The companies aggregate purchase histories with a single account number. They can determine what charges are made to which businesses, but they are limited in granularity of profiles because the extent of their knowledge about a consumer is limited inferences associated with individual businesses to which the consumer makes charges. If a significant number of charges are made to a well-known fast food chain, then it may be inferred that the consumer is a fan of fast food, but the type of fast food (e.g., hamburgers, chicken sandwiches, ice cream, etc.) remains unknown. If the consumer makes charges to a big box chain (e.g., Walmart or Amazon), even less may be inferred regarding that consumer's tastes.

Amazon users know well that their purchase histories are being employed to manipulate digital content every time they log on to search for products; however, their profiles are generated exclusively through the Amazon digital channel and thus may only be effectively employed for incentives and retention purposes through that channel.

Third-party food delivery services such as GrubHub, Caviar, and Uber Eats have gone to great lengths to generate consumer taste profiles based upon a registered consumer's past food purchases; however, these services are limited to knowledge of the consumer's tastes only for food that is deliverable and that is offered by participating restaurants. That is, the third-party services have no detailed knowledge of a particular restaurant's full menu and the ingredients that make up individual menu items.

All of the above-noted disadvantages and limitations, and others, are addressed by the present invention, which will now be discussed with reference to FIGS. 2-14.

Figure 2:
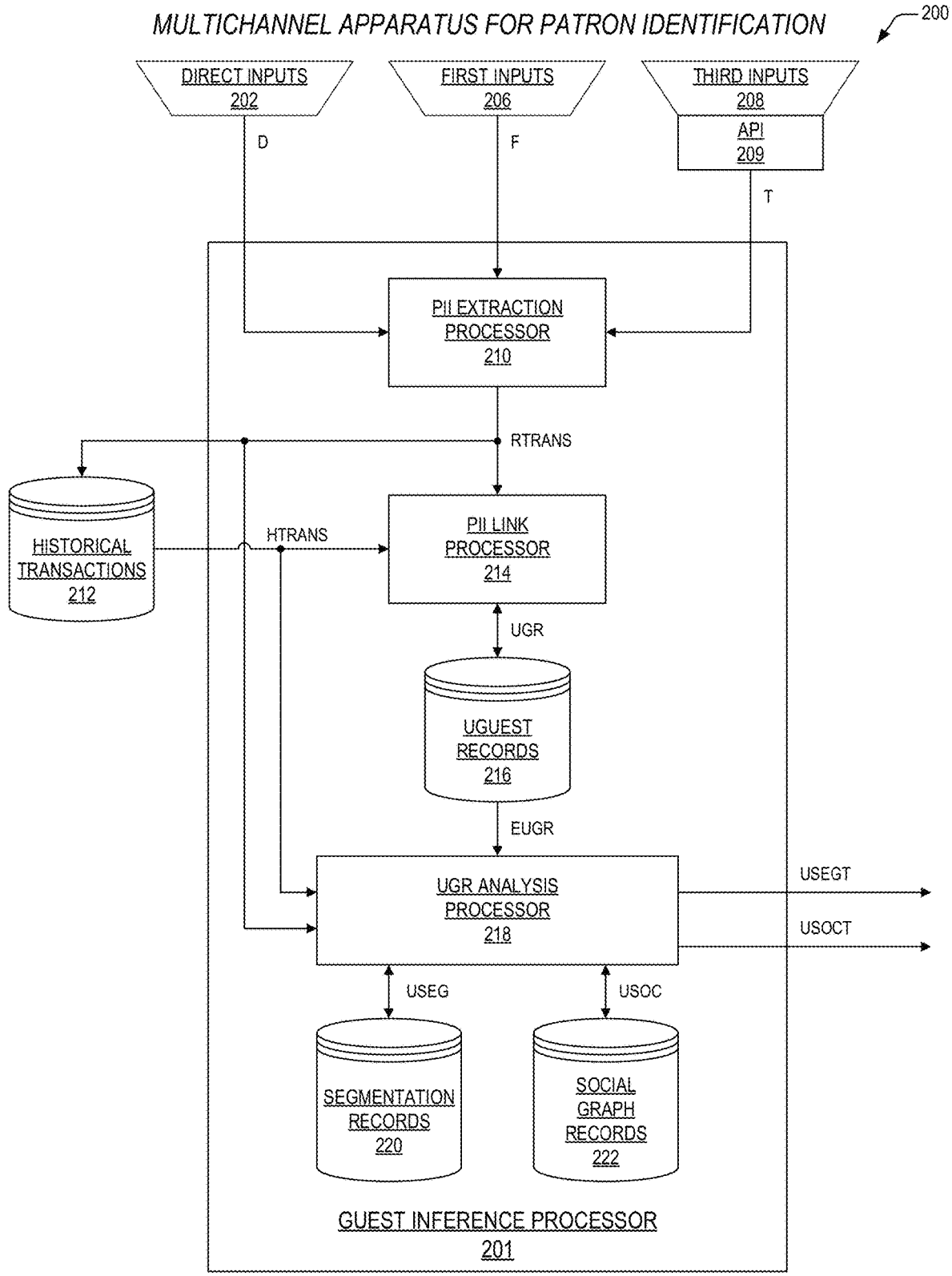
FIG. 2 is a block diagram depicting a multichannel apparatus for patron identification according to the present invention.
Figure 3:
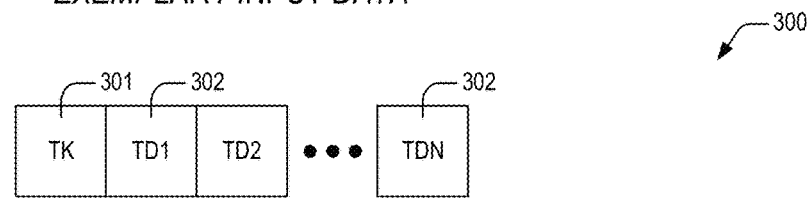
FIG. 3 is a diagram featuring an exemplary input data format according to the present invention that may be employed by the apparatus of FIG. 2.

Referring to FIG. 2, a block diagram is presented depicting a multichannel apparatus 200 for patron identification according to the present invention. The multichannel apparatus 200 is configured to receive inputs from more than a single channel. In the embodiment shown, the apparatus 200 may receive direct inputs 202, such as those entered by staff via an input source to a point-of-sale (POS) system. The direct inputs 202 may comprise items ordered by a patron either in person or over the phone, information read from any and all credit card readers employed for reservation and/or payment, information received via a low power Bluetooth beacon located within a corresponding retail establishment, information received via a camera and facial recognition software executing within the POS system, information received via a barcode scanner (e.g. loyalty cards, gift cards), information input directly into the POS system via a customer facing touchscreen display, and information directly input in the POS system via any other form of peripheral device that forms part of the POS system. A portion of the direct inputs 202 may comprise PII or metadata from which PII may be inferred. These direct inputs 202 are provided to a guest inference processor 201 via bus D.

The apparatus 200 may also receive information via first-party inputs 206, which comprise online ordering system orders, smartphone-based proprietary ordering application orders, gift card purchases, and loyalty program registration that are entered into the POS system through a web-based POS interface, a smart device app that is part of the POS system, or a POS terminal that functions as a self-serve kiosk within the retail establishment, as appropriate. A portion of the first-party inputs 206 may comprise PII or metadata from which PII may be inferred. These first-party inputs 206 are provided to the guest inference processor 201 via bus F.

The apparatus 200 may further receive information via third-party inputs 208, which interface to the POS system through an application programming interface API 209. Channels for the third-party inputs 208 may comprise, but are not limited to, reservation applications (e.g., OpenTable, RESY, etc.), delivery services (e.g., GrubHub, UberEats, Caviar, etc.), and geofencing applications (e.g., Google Maps, Yelp, etc.). The third-party inputs 208, may comprise orders, gift card purchases, and loyalty program registration, a portion of which may comprise PII or metadata from which PII may be inferred. These third-party inputs 208 are provided to the guest inference processor 201 via bus T.

The inputs 202, 206, 208 from the three channels are routed via buses D, F, and T to a PII extraction processor 210 within the guest inference processor 201. The PII extraction processor 210 is coupled to a PII link processor 214 and to a historical transactions data stores 212 via bus RTRANS. The historical transactions data stores 212 is also coupled to the PII link processor 214 via bus HTRANS.

The PII link processor 214 is coupled to a universal guest records data stores 216 via bus UGR and the universal guest records data stores 216 is coupled to a universal guest records (UGR) analysis processor 218 via bus EUGR. The UGR analysis processor 218 is coupled to the historical transactions data stores 212 via bus HTRANS and to the PII extraction processor 210 via bus RTRANS. The UGR analysis processor 218 is coupled to a segmentation records data stores 220 via bus USEG and to a social graph records data stores 222 via bus USOC. The UGR analysis processor 218 may provide segmentation records and social graph records for a current transaction via buses USEGT and USOCT, respectively.

In operation, whenever any inputs 202, 206, 208 are received via the buses D, F, T, they are routed to the PII extraction processor 210. The PII extraction processor 210 is configured to identify and extract any and all PII from input data that is provided. An exemplary input data format is presented with reference to FIG. 3 that shows an input data frame 300 comprising a transaction key field 301 and one or more transaction data fields 302. The value of the transaction key field 301 is a unique identifier that is associated with the contents of the data fields 302. The PII extraction processor 210 may employ deterministic search techniques to identify and segregate all PII data associated with the transaction key stored in the transaction key field 301. For input data 300 that is received via more than one of the input channels 202, 206, 208, the PII extraction processor 210 may employ statistical techniques to correlate PII identified in different frames 300 having different values of the transaction key field 301, and if two or more frames 300 are indicated as corresponding to the same transaction, the PII extraction processor 210 may aggregate all of the transaction data fields 302 within a single frame 300 having a single transaction key field value 301. The extracted, segregated, and aggregated real-time PII data is thus provided to both the historical transactions data stores 212 and the PII link processor 214 via bus RTRANS.

Figure 4:
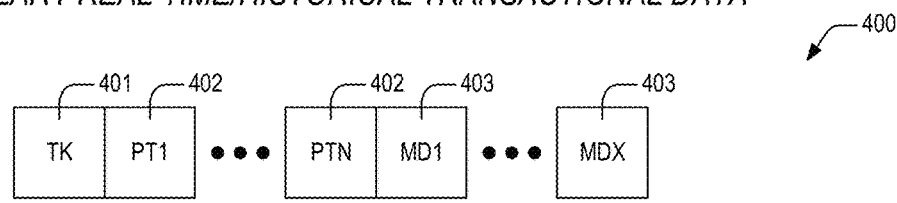
FIG. 4 is a diagram showing an exemplary data format for both real-time and historical transactional data that may be employed by the apparatus of FIG. 2.

FIG. 4 shows an exemplary format for a transactional data frame 400 that is provided to the PII link processor 214 and historical transactions data stores 212 via bus RTRANS and that may be accessed by the PII link processor 214 and the UGR analysis processor 218 via bus HTRANS. The transactional data frame 400 may comprise a transaction key field 401 as provided by the PII extraction processor 214 along with one or more PII transaction fields PT1-PTN 402 and one or more metadata fields MD1-MDX 403. The PII transaction fields PT1-PTN 402 contain one or more pieces of PII information that have been extracted from transaction input data frames 300. The metadata fields MD1-MDX 403 contain all other data from the input data frames 300 that has not been identified as PII information such as, but not limited to, order type, order time, geolocation, etc. For example, one of the PII transaction fields PT1-PTN 402 may comprise an email address corresponding to the transaction. Other PII transaction fields PT1-PTN 403 may include PII information that includes, but is not limited to, patron name (provided verbally, digitally, or read from a credit card reader), patron address, patron phone number, patron loyalty or gift card number (input by patron or scanned from a loyalty/gift card), first-party patron registration information corresponding to a low-power Bluetooth beacon, first-party patron registration information corresponding to a recognized facial image within the retail establishment, and third-party PII provided via the API 209 to the inference processor.

As transactions occur in real-time, they are stored in the historical transactions data stores 212 and are provided to the PII link processor 214. The PII link processor 214 is configured to employ statistical algorithms to analyze all PII provided in the PII transaction fields PT1-PTN 402 and the metadata provided in the metadata fields MD1-MDX 403, and to generate or designate a single universal guest record that corresponds to all of the analyzed PII transaction fields PT1-PTN 402 and metadata fields MD1-MDX 403. In performing this analysis, the PII link processor 214 may employ one or more of the PII transaction fields PT1-PTN 402 as keys to access historical transaction records stored in the historical transactions data stores 212 via bus HTRANS. For example, if PII extracted from the real-time transactional data consists of a phone number and a first name, and if historical transaction data associated with the phone number also includes an email address, then the PII link processor

214 may generate a universal guest record that comprises the first name, the phone number, and the email address. In another example, the PII link processor 214 may correlate a typical man's first name (e.g., John) stored in the historical transactions data stores 212 with a provided image of a man provided in real time. Examples abound regarding how individual bits of PII may be combined to resolve to a single person, herein referred to as a universal guest record, which is an objective of the present invention, for by disambiguating two or more individuals corresponding to one or more pieces of PII into a single patron, more effective upsell, cross-sell, and retention strategies may be employed. Function of the PII link processor 214 extends to analysis of metadata as well with the objective of resolving to a single patron. For instance, consider that a known guest, John Smith (as read by a card reader), always orders menu item #1 on Mondays, Wednesdays, and Fridays between 8:00 AM and 8:15 AM. When this patron uses a previously unknown credit card that has the name "John S. Smith" to then order menu item #1 on a Wednesday at 8:10 AM, the PII link processor 214, based on historical transaction data provided via HTRANS and uniqueness of the name on the credit card, may resolve that PII to the UGR for John Smith. If this patron instead uses cash to order menu item #1 on a Wednesday at 8:10 AM, the transaction may not be resolved by the PII link processor 214 to John Smith (as above) because more confidence may be needed (i.e., some other patron may have made this cash order).

Algorithmically, the PII link processor 214 employs a graph-based algorithm to disambiguate guest records, as alluded to above. In this embodiment, each unique PII element (e.g., an email address, "a@a.com") becomes a first node in the graph having edges with weight values equal to the number of transactions containing the first node and other corresponding nodes. As such, a "user" is defined as a disjoint subgraph (i.e., a group of connected nodes having no edges connecting to any other node). The PII link processor 214 may further drop as outliers any node with greater than a first prescribed number of edges. For example, if the first prescribed number of edges is set to 1000, the PII link processor 214 would consider all nodes having greater than 1000 edges as being outliers and would drop these nodes as invalid values. Similarly, for any user subgraph with greater than a second prescribed number of nodes, then the PII link processor 214 may drop a subgraph member node with the greatest number of edges compared to all remaining subgraph member nodes. For instance, a given subgraph member node with less than 1000 edges may link, say, five true users creating a single user subgraph having more than the second prescribed number of nodes, and when the given subgraph member node is dropped (because it has the greatest number of edges), the five true users would each have disjoint subgraphs comprising only their corresponding PII values.

The present inventors note that the thresholds (i.e. prescribed numbers) above may be adjusted to increase or decrease accuracies as a function of technical and business objectives. Alternatively, the thresholds may be inferred from computing statistics of the graph by analyzing the distribution of numbers of edges per node and dropping outliers that result from the statistical analysis.

Figure 5:
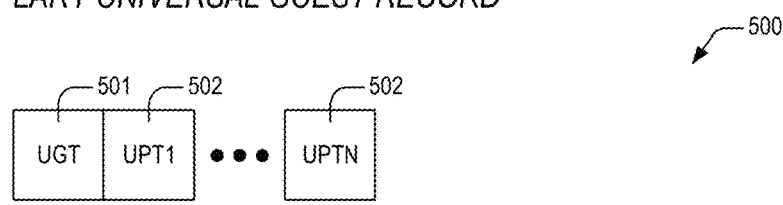
FIG. 5 is a diagram illustrating an exemplary universal guest record data format according to the present invention that may be employed by the apparatus of FIG. 2.

The PII link processor 214 not only creates universal guest records for storage in the UGR records data stores 216 but may also access existing UGR records to modify and enhance them with newly correlated PII and metadata. An exemplary universal guest record frame 500 is shown in FIG. 5. The UGR frame 500 may comprise a UGR token field UGT 501, the contents of which uniquely identify a single patron. The frame 500 may also comprise one or more UGR transaction fields UPT1-UPTN 502 that comprise metadata corresponding to all present and historical transactions associated with the single patron. The metadata may comprise directly ordered or purchased items, exceptions, time of day, season of year, frequency of purchases, and etc. In a preferred embodiment, the present and historical transactions may be associated to one or more of a substantial number of retail establishments that are subscribers to a cloud-based POS service, as will be described in more detail below, for it is an objective of the present invention to employ all purchases and orders by a subscriber across as many retail establishments as possible in order to generate UGR profiles that more accurately reflect the single patron's tastes, timing, spending habits, and predispositions. As discussed, UGR records within the UGR data stores 216 are modified to include (or eliminate) PII fields to more reliably resolve to a single patron. These modified UGR records are provided to the UGR analysis processor 218 via but EUGR.

Figure 6:
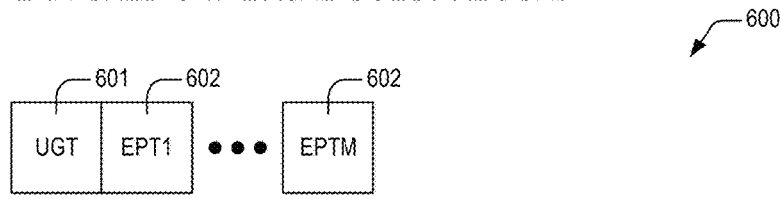
FIG. 6 is a diagram detailing an exemplary enriched universal guest record data format according to the present invention that may be employed by the apparatus of FIG. 2.

FIG. 6 shows an exemplary enriched UGR record 600 that may be access via bus EUGR. The enriched UGR record 600 may comprise a UGR token 601, essentially the same as token 501, along with enriched UGR transaction fields EPT1-EPTM 602 that may be more or less in number than those of the exemplary UGR record 500 of FIG. 5, but which more accurately correlate to the single patron designated by the value of the UGR token 501, 601.

Figure 7:
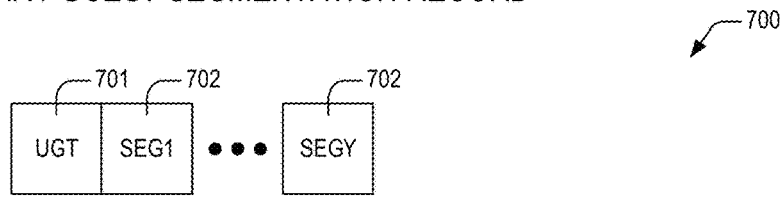
FIG. 7 is a diagram depicting an exemplary guest segmentation record data format according to the present invention that may be employed by the apparatus of FIG. 2.

Enriched UGRs are accessed by the UGR analysis processor 218 via bus EUGR along with real-time transaction data provided via bus RTRAN and historical transaction data provided via the historical transactions data stores 212. The UGR analysis processor 218 is configured to perform statistical algorithms on the transaction data for a single patron in order to determine and iteratively revise the patron's tastes, timing, spending habits, and predispositions in the form of a guest segmentation record. An exemplary guest segmentation record 700 is shown in FIG. 7. The guest segmentation record 700 may comprise a UGR token 701 field that uniquely identifies a single patron and one or more segment fields 702, the values of which identify segments corresponding to the single patron where the segments are indicative of the patron's tastes, timing, spending habits, and predispositions. Exemplary segment fields 702 may include, but are not limited to, type of product routinely purchased (e.g., hamburger, vegetarian, Mexican, Indian, etc.), special requirements (e.g., handicap accessible), long-term spending amounts, average check size, number of successful upsells, expected purchase days, expected purchase times, expected purchase seasons of the year, purchases made alone, purchases made with other UGRs, restaurant preferences (e.g., quick serve, takeout, delivery, full service), alcohol purchases, desert purchases, number, identification, and geolocations of all POS system subscriber businesses from which the single patron has placed orders, time from order placement to order payment, etc. Advantageously, the present invention overcomes present-day disadvantages resulting from single channel provision of PII by extracting and analyzing PII from multiple input channels 202, 206, 208 to more accurately resolve transaction data to a single patron, and to employ transaction data by that patron across a number of retail establishments that are subscribers to a cloud-based POS subscriber system in order to generate segments 702 that indicate the patron's tastes, timing, spending habits, and predispositions more accurately and reliably than that which has heretofore been provided.

Figure 8:
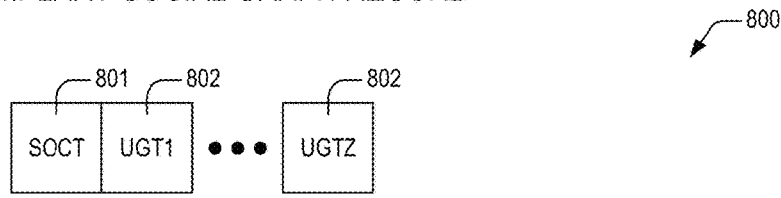
FIG. 8 is a diagram featuring an exemplary social graph record data format according to the present invention that may be employed by the apparatus of FIG. 2.

In another aspect, the UGR analysis processor 218 is also configured to process transactional data across multiple UGR records in order to generate a social graph record, such as the exemplary social graph record 800 shown in FIG. 8. In one embodiment, the UGR analysis processor 218 is configured to analyze and group transactional data for two or more UGR records, where their transactions are close together in time of day and geolocation proximity (determined by GPS, Wi-Fi or Bluetooth triangulation, or by other metadata such as table/booth number, check splitting, redemption of gift cards, group ordering via a digital channel, etc.). Thus, the social graph record 800 may comprise a social token field 801 that identifies a unique grouping of UGR tokens that are identified by contents of UGR token fields 802. Thus, more effective upsell, cross-sell, and retention strategies may be employed to affect members of a social graph grouping.

Having now discussed the apparatus and methods according to the present invention for receiving PII from multiple channels, for analyzing and linking PII to resolve to a single patron more accurately than has heretofore been provided, and for analyzing transactional data corresponding to a particular patron along with other social patrons to generate highly reliable segments and social graphs indicative of the particular patron's tastes, timing, spending habits, predispositions, and social tendencies across a substantial number of retail establishments, embodiments of the present invention will now be presented with reference to FIGS. 9-14 in the context of a POS subscriber system that is specifically configured for the hospitality industry. Though examples follow that are specifically tailored for restaurant POS and patron engagement systems, the present inventors note that such examples are provided in order to clearly teach aspects of the present invention; however, it should be noted that the scope of systems according to the present invention may extend to other retail segments outside of the restaurant segment.

Figure 9:
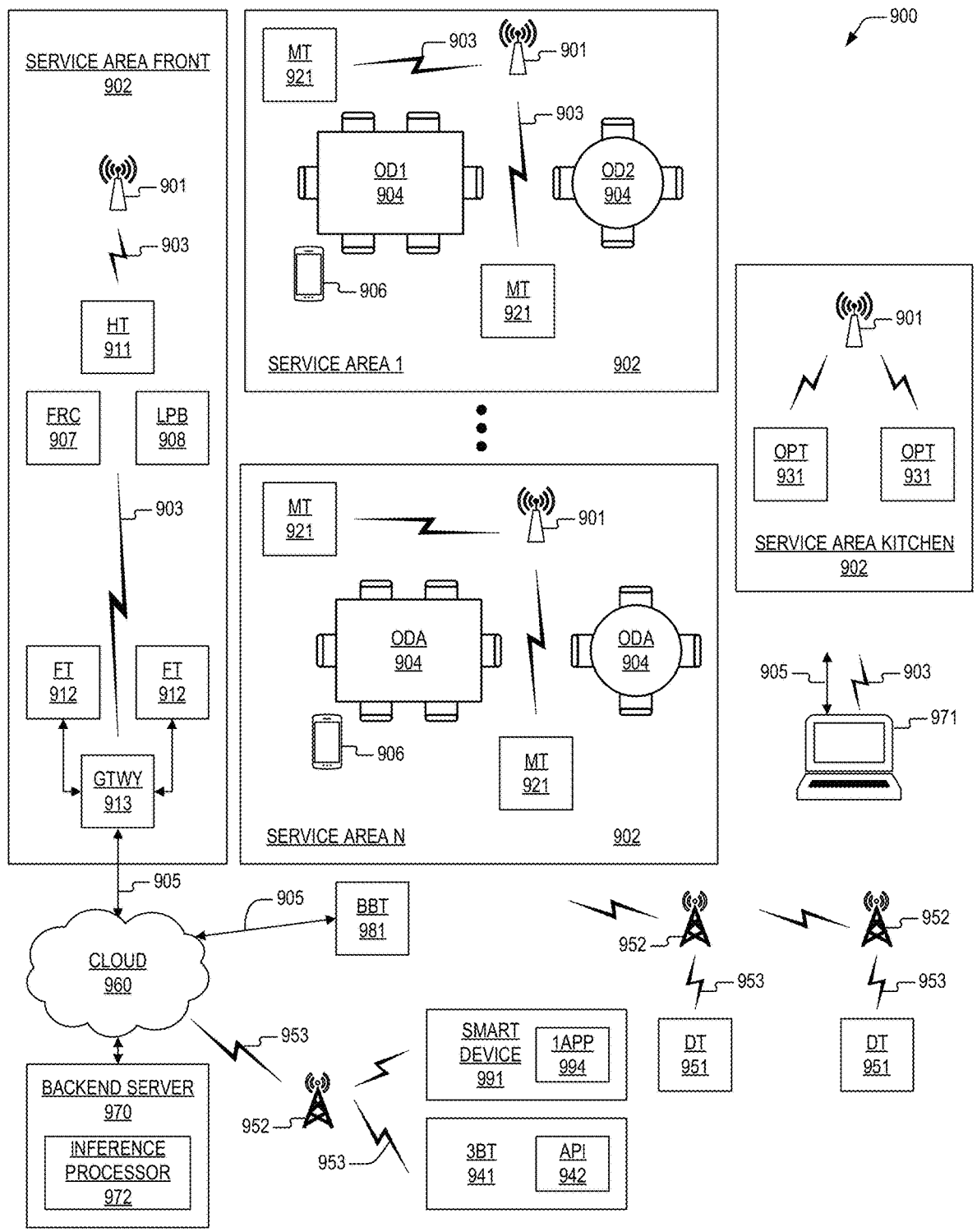
FIG. 9 is a block diagram showing a point-of-sale synchronization system according to the present invention.

Turning to FIG. 9, a block diagram is presented showing a point-of-sale synchronization system 900 according to the present invention. The synchronization system 900 may include one or more service areas 902, such as a front service area 902, service area 1 902-service area N 902, and service area kitchen 902. As noted above, restaurant terms such as host, wait staff, cook, kitchen, food item, etc. may be employed to clearly teach the present invention in a given context; however, as noted above, broader and different retail establishment types are contemplated.

The service areas 902 may comprise one or more wireless access points 901. The service areas 902 may also comprise one or more wireless POS terminals 911, 921, 931, coupled to the access points 901 via wireless links 903, and which are distinguished in the system 900 as a host terminal 911, mobile terminals 921, and order processing terminals 931. Typically, the mobile POS terminals 921 are of an 8-inch handheld display size, though other sizes are contemplated. The host terminals 911 may be coupled to the access points 901 via wireless links 903. Alternatively, the host terminals 911 may be hardwired. The fixed terminals 912 in the service areas 902 are hardwired to a gateway 913. Alternatively, one or more of the fixed terminals 912 may be coupled to the access points 901 via the wireless links 903. Typically, the host terminals 911 and fixed terminals 912 are approximately of a 15-inch POS display size, though other sizes are contemplated. The order processing terminals 931 are coupled to the access points 901 via the wireless links 903. Alternatively, the order processing terminals 931 may be hardwired to the gateway 913. Typically, the order processing terminals 931 are approximately of a 22-inch display size for ease of use in a kitchen 902 or other order processing area 902, though other sizes are contemplated. Thus, the mobile terminals 921 are referred to as such because they move about the service areas 902. As a result, the mobile terminals are all coupled to the access points 901 via the wireless links 903. The host terminal 911 may be moved about the services areas 902 as well, in which case it will be categorized as mobile, though having a larger display size generally than the mobile terminals. Or the host terminal 911 may be in a fixed location, typically mounted to a stand (not shown), and may be wireless or hardwired. When in a fixed location, the host terminal 911 is categorized as fixed.

The service areas 902 may further comprise one or more facial recognition cameras 907 that are either hardwired or wireless. The service areas 902 may also comprise one or more low-power Bluetooth beacons 908 that are either hardwired or wireless.

The gateway 913 provides for coupling of the terminals 912 (optionally, 921, 931) that are hardwired and access points 901 an internet cloud 960 via conventional wired links 905 such as, but not limited to, Ethernet, cable, fiber optic, and digital subscriber line (DSL). As part of the network path to and through the cloud 960, providers of internet connectivity (e.g., ISPs) may employ wireless technologies from point to point, etc., but for purposes of this application, links 905 will be referred to as conventional wired links 905 to distinguish them from local and cellular wireless links 953. The wireless links 903, 953 may comprise, but are not limited to, Wi-Fi, Bluetooth, near field communications, infrared links, IEEE 802.15.4, Zigbee radio links, and cellular based links (e.g., 3G, 4G, LTE, 5G) or a combination of the noted links. The POS terminals 911, 912, 921, 931 may be configured differently to comport with intended function (i.e., host seating, order entry and upsell/cross-sell, order fulfillment, payment processing, patron engagement, etc.), or they may be configured similarly. In one embodiment, the mobile terminals 921 may comprise a touch screen display and integral payment processor (e.g., card/chip/tap readers) that provide for both order entry, display of order status, and payment processing. The host terminal 911, fixed terminals 912, and order processing terminals 931 may comprise larger touch screens to allow for easier viewing by restaurant staff, or they may comprise displays with keyboard entry. In one embodiment, terminals 911, 912, 931 may comprise desktop computers, laptop computers, smartphones, or tablets that are running application programs or web-enabled application programs that provide for communication with a backend server 970 for purposes of order entry, status updates, and optionally, payment processing. In one embodiment, one or more of the terminals that are characterized as fixed may comprise an integral payment processor (i.e., card/chip/tap reader) that provides for payment processing.

The backend server 970 is coupled to the internet cloud 960 and to an administrative console 971 that is operably coupled to the backend server 970 via a conventional wired link 905 and/or a wireless link 903. The backend server 970 is not on-premise and is thus referred to as a cloud server 970. The backend server 970 may comprise a guest inference processor 972, substantially similar to the guest inference processor 201 discussed above with reference to FIGS. 2-8, and as will be described in further detail hereinbelow.

The administrative console 971 may be disposed within the restaurant premises and coupled to the backend server 970 via the links 903, 905, or the console 971 may be disposed in another location, say, at an operations center for multiple restaurants within a given region. In addition, the system 900 may comprise one or more browser-based terminals 981 that are coupled to the backend server 970 via links 905. In one embodiment, the browser-based terminals 981 may comprise desktop computers, laptop, computers, smartphones, or tablets that are running stand-alone applications or web-enabled applications that provide for communication with the backend server 970 for purposes of order entry, status updates, and optionally, payment processing, where payment data is manually entered.

The system 900 may further comprise one or more smart devices 991 that are coupled to the backend server 970 via the cellular links 953 and one or more cellular access points 952 provide for connection to the backend server 970 though the cloud 960. The smart devices 941 may comprise desktop computers, laptop, computers, smartphones, or tablets that are running stand-alone third-party applications or web-enabled third-party applications that provide for communication with the backend server 970 for purposes of order entry, status updates, and optionally, payment processing via a proprietary first-party application 994 that is executing on the smart devices 991 that that directly communicates with the backend server 970. Communications from the first-party application 994 are employed by the guest inference processor 972 as first-party inputs for purposes of extracting PII and analyzing both PII and corresponding metadata.

The system 900 may further comprise one or more third-party-based terminals 941 that are coupled to the backend server 970 via the cellular links 953 and one or more cellular access points 952 provide for connection to the backend server 970 though the cloud 960. The third-party-based terminals 941 may comprise desktop computers, laptop, computers, smartphones, or tablets that are running stand-alone third-party applications or web-enabled third-party applications that provide for communication with the backend server 970 for purposes of order entry, status updates, and optionally, payment processing via a proprietary application programming interface (API) 942. An example of such a terminal 941 may include one or more of well-known third-party applications such as GrubHub®, Caviar®, Door Dash®, Yelp®, UberEats®, and the like, where the third-party applications are configured to indirectly communicate with the backend server 970 via the API 942. Communications from the third-party applications via the API 942 are employed by the guest inference processor 972 as third-party inputs for purposes of extracting PII and analyzing both PII and corresponding metadata.

The system 900 may additionally comprise one or more mobile delivery terminals 951 that are coupled to one or more cellular access points 952 via cellular wireless links 953, and the cellular access points 952 are coupled to the backend server 970 via the cloud 960. In one embodiment, the delivery terminals 951 are identical to the mobile terminals 921 and are configured to provide services for order entry and upsell/cross-sell, order fulfillment (i.e., delivery), patron engagement, and payment processing. In another embodiment, the delivery terminals 951 are disposed as smartphone or tablets with a detachable payment processor (e.g., card/chip/tap reader). In a further embodiment, the delivery terminals 951 are disposed as smartphone or tablets with a payment processor integrated within a single housing. Other embodiments are contemplated.

Service areas 902 corresponding to the mobile terminals 921 may have one or more tables 904 corresponding to one or more orders. For clarity, service area 1 902 depicts two tables 904, one of which corresponds to order 1 OD1, and the other of which corresponds to order 2 OD2. The mobile terminals 921 within service area 1 902 may processes portions of both order 1 OD1 and order 2 OD2. Service area N 902 depicts two tables 904, both of which correspond to order A ODA. The mobile terminals 921 within service area N 902 may both process portions order A ODA. Though disposed within separate service areas (service area 1 902-service area N 902), the mobile terminals 921 therein may be further configured to process portions of any and all orders within the restaurant and may roam from service area 902 to service area to support work load of the restaurant.

The order processing terminals 931 may process all orders in the restaurant, or they may be configured to each process a portion of all of the orders in the restaurant according to preparation station or inventory station.

The host terminal 911 and fixed terminals 912 may be configured to process all orders in the restaurant to provide for on-premise seating assignment, order initiation and upsell/cross-sell, order selection, patron engagement for loyalty and retention purposes, and payment processing, including closeout of orders.

One or more of the terminals host terminals 911, fixed terminals 912, mobile terminals 921, and order processing terminals 931 may be configured in an owner mode as will be described in further detail below, to allow an owner of the restaurant to transmit and receive messages from the backend server 970 that are relevant to management of the restaurant. The types of functions that are enabled when in owner mode may include POS subscription services management, views of POS totals and statistical metrics for programmable periods (e.g., daily, weekly, monthly, yearly), comparisons of POS totals and statistical metrics from two or more programmable periods (e.g., Q1 9016, Q1 9017, Q1 9018), views of fixed and variable POS subscriber charges (including credit card processing fees), and communications with POS subscription support staff and regional representatives.

One or more restaurant staff members (not shown) within service area 1 902-service area N 902 may have a personal device (e.g., smartphone, tablet, laptop) 906 that can provide for an ad hoc network (i.e., hotspot) to which one or more of the mobile terminals 921 may tether for purposes of communicating with the backend server 970 in the absence of Wi-Fi connectivity to the access points 901.

In one embodiment, operations are initiated when the one or more patrons "enter" the restaurant, either in person, by phone, by browser-based applications 981, by first-party applications 994, or by third-party applications via API 942. For in-person entry, a host (not shown) will create an order (along with corresponding order identifier (OID) via the host terminal 911 for the one or more patrons and will seat the patrons at one or more tables 904. The created order may include service area designation and assignment of the order to one or more mobile terminals 921. In another embodiment, mobile terminals 921 within a service area 902 are assigned to all orders within that service area 902. Other embodiments are contemplated. The created order and service area assignment are transmitted over the cloud 960 to the backend server 970, which maintains durable terminal queues within which are stored order updates for all orders in the restaurant. Each of the plurality of durable terminal queues corresponds to each of the POS terminals 911, 912, 921, 931, 951 within the system 900. When connection status to a given terminal 911, 912, 921, 931, 951 is down (i.e., the server 970 cannot verify communication with the given terminal 911, 912, 921, 931, 951), then the server 970 maintains the order updates for that terminal 911, 912, 921, 931, 951 until connectivity is reestablished, at which time the server 970 may transmit one or more of the order updates to the terminal, verifying with each transmission that the terminal 911, 912, 921, 931, 951 received the update. Advantageously, each of the terminals 911, 912, 921, 931, 951 is capable of processing portions of any of the orders in the restaurant.

Likewise, each of the terminals 911, 912, 921, 931, 951 maintains durable order queues within which are stored order updates only for each of the orders being processed by the terminal 911, 912, 921, 931, 951. Each of the 911, 912, 921, 931, 951 also maintains a plurality of order states that depict a current state for each of the orders in the restaurant. As a patron selects one or more menu items, wait staff enters the menu items as an update in one of the terminals 911, 912, 921, 931, 951, generally a mobile terminal 921 assigned to the given service area 902. The order update is entered into one of the durable order queues that corresponds to the order ID. If connectivity is present, then the terminal 911, 912, 921, 931, 951 transmits the order update to the server 970 and waits for the server 970 to acknowledge the order update. If acknowledged, the terminal 911, 912, 921, 931, 951 removes the order update from the one of the durable order queues. If unacknowledged (i.e., in the case of non-persistent network connectivity), the terminal 911, 912, 921, 931, 951 maintains the order update in the one of the durable order queues until such time as connectivity is reestablished, and the terminal 911, 912, 921, 931, 951 completes transmission of the order update with acknowledgement by the server 970.

Upon reception of a particular update from the server 970, the terminals 911, 912, 921, 931, 951 may check one of their plurality of order states that correspond to the particular update for conflicts. If a conflict exists, the terminals 911, 912, 921, 931, 951 may utilize domain specific rules to resolve the conflict in order to establish a valid order state. Each of the terminals 911, 912, 921, 931, 951 is configured with the same domain specific rules to provide for consistent resolution of order states.

As patrons continue to order items corresponding to the order ID, the one or more of the terminals 911, 912, 921, 931, 951 may enter the order updates and transmit/durably queue the order updates to the server 970 in accordance with connectivity conditions. The server 970 may also queue/transmit order updates for all orders in the restaurant to each of the terminals 911, 912, 921, 931, 951 according each terminal's connectivity. Digital menu content modifications initiated by the guest inference processor 972 for purposes of upsell and cross-sell, order fulfillment, patron loyalty engagement, payment, and closeout are likewise handled as order updates through the server 970 and are queued/transmitted to all of the terminals 911, 912, 921, 931, 951 in accordance with the connection status of each terminal.

Patrons outside of the restaurant are handled in similar fashion via the browser-based terminals 981, smart first-party devices 991, and third-party terminals 941, though without synchronous feedback from the server 970 regarding all orders in the restaurant. When accessed through the browser-based terminals 981, first-party smart devices 991, and third-party terminals 941, the server 970 creates and order ID and assigns it to one of the order processing terminals 931 for fulfillment, while sending status updates on the order ID to all of the terminals 911, 912, 921, 931, 951 via the durable terminal queue therein. The server 970 may designate a specific delivery terminal 951 for pickup, delivery, and payment based upon geofenced proximity to the restaurant, or based upon workload corresponding to the delivery terminal 951. Proximity to the restaurant may be determined by a number of different mechanisms, as will be described in further detail below.

The administrative console 971 may maintain a master record of all order states and order updates according to all of the terminals 911, 912, 921, 931, 951 in order to provide for restaurant management, maintenance, analytics, and network traffic analyses. The console 971 may alternatively be disposed in an expediter's area of the restaurant for use by expediters in assignment and allocation of patron seating and terminals 911, 912, 921, 931, 951. The console 971 may further be configured to operate in an owner mode, as described above.

The facial recognition cameras 907 may be configured to send images to the backend server 970 that may be employed by the guest inference processor 972 for purposes of extracting additional PII regarding patrons. In one embodiment, the guest inference processor 972 is configured to correlate received images to both registered and unregistered patrons in order to identify corresponding universal guest records.

The low-power Bluetooth beacons 908 may be configured to wake up a first-party app 994 when the smart device 991 is within proximity, and may be further configured to access PII from the app 994 that may be employed to identify a patron's universal guest record.

The durable terminal queues and durable order queues may be disposed as battery backed random-access memory, electrically-erasable programmable read-only memory, solid state memory, hard disk memory, or a combination of the above that will provide for maintaining order updates within the queues across network and power interruptions.

Advantageously, the present invention provides for more efficient performance of computational resources within the server 970 and the POS terminals 911, 912, 921, 931, 951 over that which has heretofore been provided because multiple 911, 912, 921, 931, 951 may be assigned to process portions of a single order, resulting in more timely processing of the single order. Similarly, any of the 911, 912, 921, 931, 951 in the restaurant may be immediately reassigned to a particular order to replace a malfunctioning terminal or to increase throughput of the server 970. Accordingly, computational resources 911, 912, 921, 931, 951, 970 within the system 900 are afforded an overall performance improvement as a result of the present invention.

In one embodiment, the guest inference processor accesses direct inputs 202, first-party inputs 206, and third-party inputs 208 in the form of messages received by the backend server 970 over the cloud 960, where the messages may originate from the gateway 913 (direct), the first-party application 994, and the third-party API 942, respectively.

Figure 10:
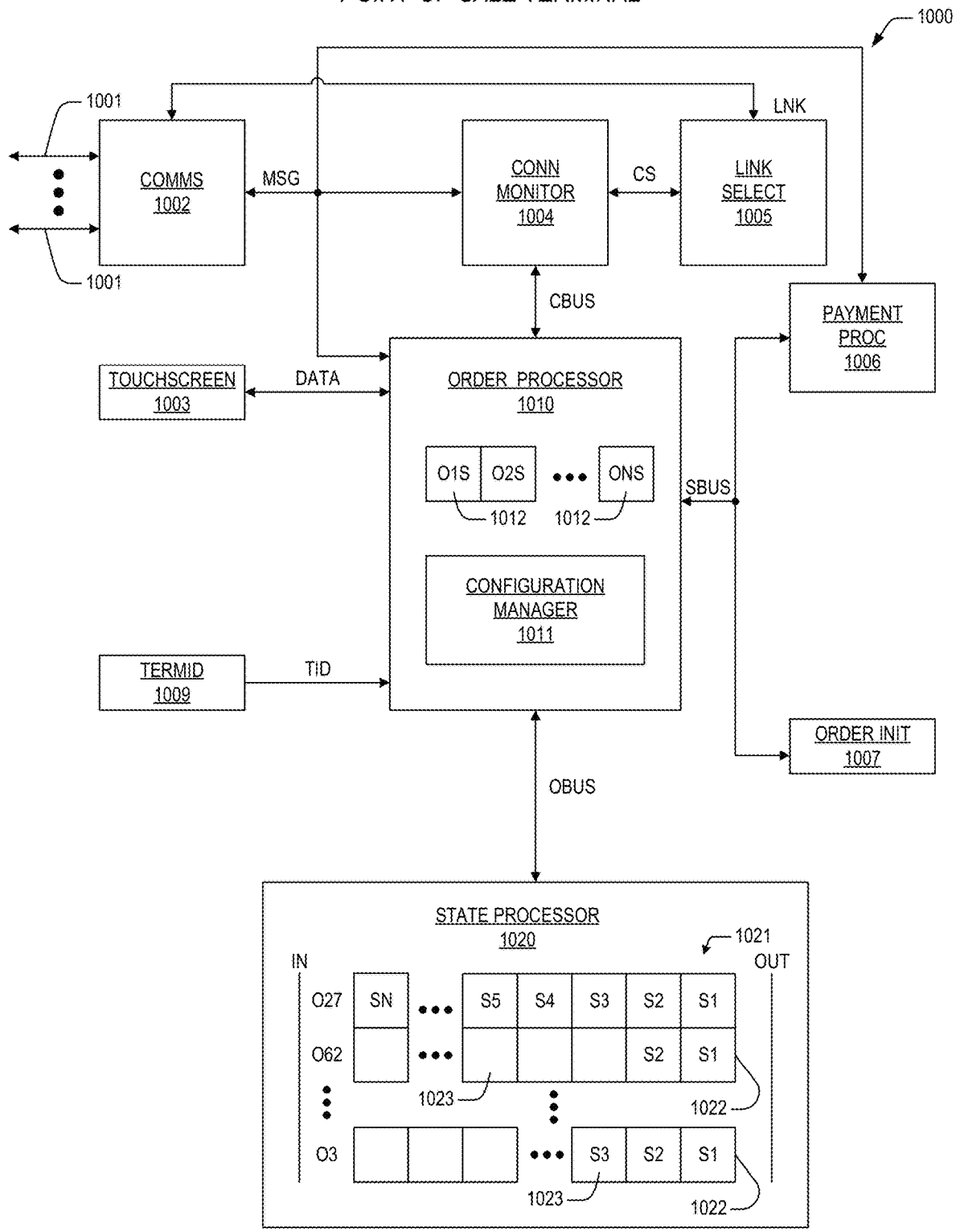
FIG. 10 is a block diagram illustrating a point-of-sale terminal according to the present invention that may be employed in the system of FIG. 9.

Now referring to FIG. 10, a block diagram is presented featuring a POS terminal 1000 according to the present invention. The POS terminal 1000 may be characterized as fixed or mobile. When characterized as fixed, the POS terminal 1000 may be hardwired to a gateway 913 or may be coupled to the gateway 913 via wireless access points 901, as described above with reference to FIG. 9. The terminal 1000 may comprise a communications circuit COMMS 1002 (e.g., transceivers, modems, message formatter, etc.) that is coupled to one or more wired or wireless communications links 1001, examples of which are described above. The terminal 1000 may also comprise a connection monitor 1004, an order processor 1010, and a payment processing element 1006, all of which are coupled to COMMS 1002 via a message bus MSG. The terminal 1000 may also comprise a link select element 1005 that is coupled to the connection monitor 1004 via bus CS and to the COMMS 1002 via bus LNK. The order processor 1010 is coupled to the connection monitor 1004 via bus CBUS and to the payment processor 1006 and an order initiation element 1007 via bus SBUS. The order processor 1010 is coupled to a touchscreen display 1003 via bus DATA and to a terminal ID element 1009 via bus TID. The order processor 1010 is also coupled to a state processor 1020 via a queue bus QBUS.

The state processor 1020 may include a durable order update queue 1021 that includes order update records 1022, each of which are associated with a corresponding order for the terminal 1000. Individual terminals 1000 are identified by their corresponding terminal ID, which may be stored within and accessed from the terminal ID element 1009. The terminal ID element 1009 also is employed for storage and retrieval of terminal configuration information (e.g., order processing terminal, kiosk, mobile terminal, host terminal, owner mode terminal, etc.).

Each of the order update records 1022 may comprise order state fields 1023, which are employed to queue order state changes (i.e., order updates) for transmission to a backend server (not shown) as connectivity to the backend server permits. State fields 1023 nearest to OUT are the oldest order state changes queued for transmission to the backend server. State fields 1023 nearest to IN are youngest (or most recent) order state changes queued for transmission to the backend server. Fields 1023 between the oldest state fields 1023 and the youngest state fields 1023 descend in age from oldest to youngest order state change according to when those state changes are entered by the terminal 1000.

Values of the order state fields 1023 may include, but are not limited to, an order ID along with order details taken by the terminal 1000. Accordingly, the order update record 1022 for order 27 O27 depicts a plurality of order state fields 1023 to be transmitted to the server when connectivity is reestablished. In decreasing age from oldest to youngest order state change, the fields 1023 depict order state changes S1 through SN. As one skilled in the art will appreciate, the order update record 1022 O27 depicts that many more state changes have been entered while connection status of the terminal 1000 is down than have been entered for order 62 O62 through order 3 O3. Advantageously, the terminal 1000 according to the present invention may be employed for entry of order updates even in the presence of network interruptions, which is characteristic of most Wi-Fi networks.

In operation, order state changes S1-SN result from two sources: the touchscreen 1003 and messages received over COMMS 1002 from the backend server. In the first case, wait staff may enter menu items as requested by patrons, or in the case that the terminal 1000 is configured as a kiosk 1000, the patrons may enter the order items themselves. The present invention contemplates provisions within the terminal 1000 to display menu selections and payment options to both wait staff and patrons. Order items received from the touchscreen display 1003 are provided to the order processor 1010 via bus DATA, which generates the state changes. State changes S1-SN received from the backend server are provided to the order processor 1010 via messages received over bus MSG. The terminal 1000 may be further configured as a tableside kiosk 1000 that is unattended, such as in found in some restaurants and activity concepts like bowling alleys, golf gaming venues (e.g., Topgolf). As a tableside kiosk 1000, patrons are enabled to add to existing orders to purchase additional items. The terminal 1000 may further be configured to operate in an owner mode that comprises the owner functions discussed above with reference to FIG. 9.

The connection monitor 1004 may monitor reception of a first message (e.g., a ping message) from the backend server and direct transmission of an acknowledgement message. The connection monitor 1004 may update the connectivity status of the terminal 1000 accordingly. In one embodiment, acknowledgment may comprise a simple acknowledge message. In other embodiments, acknowledgement may comprise additional data such as received signal strength indication RSSI associated with one or more access points, number of hops between the backend server and the terminal 1000, or Global Positioning System (GPS) coordinates.

The link select element 1005 may be employed to direct the COMMS 1002 to change links 1001 over which to communicate with the backend server, such as switching from Wi-Fi to LTE, for example. In one embodiment, in the absence of connectivity within the restaurant, the link select element 1005 may direct the COMMS 1002 to tether to a cellular equipped device corresponding to an order ID, such as devices 106 in FIG. 1, in order to transmit acknowledgements and order state changes to the backend server.

The connection monitor 1004 may provide connectivity status of the terminal 1000 to the order processor 1010 via bus CBUS. In one embodiment, the order processor 1010 may generate order state change messages from oldest to youngest update for each of the orders in the queue 1021. Connectivity is maintained when the terminal 1000 receives acknowledgement of a previously transmitted order state change message from the backend server. Once acknowledged, the order processor 1010 directs the state processor 1020 to delete the oldest state change update for a corresponding order ID and shift pending updates so that the next oldest state change update becomes the oldest order update. In one embodiment, state change updates are transmitted to the backend server until its order state change record 1022 is empty, or until connectivity goes down.

As discussed above, the terminal 1000 may be configured as a fixed or mobile POS terminal, a kiosk, a host terminal, a management terminal, an order processing terminal, or an owner mode terminal, where configurations differ principally in size of the touchscreen display 1003 and configuration of displayed items and available functions and controls. The configuration parameters for the terminal 1000 are stored in the terminal ID 1009 element, and the configuration parameters/features are accessed by a configuration manager 1011 within the order processor 1010 upon initialization/reconfiguration of the terminal 1000. Thus, the configuration manager 1011 may generate images for display on the touchscreen 1003 and capture text and touches thereon, in accordance with functions prescribed according to configuration parameters/features accessed from the terminal ID element 1009. The images for display on the touchscreen 1003 may be advantageously tailored to present upsell and cross-sell menu items to a patron that corresponds to a UGR identified by the guest inference processor. Likewise, the images for display on the touchscreen 1003 may be advantageously tailored to present patron retention incentives (e.g., coupons, discounts, loyalty rewards, etc.) to a patron that corresponds to a UGR identified by the guest inference processor. The images for display on the touchscreen 1003 may be advantageously tailored to present upsell and cross-sell menu items to a plurality of patrons that correspond to UGRs identified by the guest inference processor, and which are specified in a corresponding social graph record. The images for display on the touchscreen 1003 may be further tailored to present patron retention incentives (e.g., coupons, discounts, loyalty rewards, etc.) to a plurality of patrons that correspond to UGRs identified by the guest inference processor, and which are specified in a corresponding social graph record.

Messages received from the communications circuit 1002 may also require additional functions to be performed by the terminal 1000. For example, when orders are placed by a browser-based, first-party based, or third-party based terminal, the backend server may transmit the order state change to the terminal 1000 and the order processor 1010 may direct the state processor 1020 to create a corresponding order status record 1022 in the queue 1021. Similarly, when processing of transactions outside of the terminal's capabilities (e.g., financial transactions with credit card providers, loyalty card discounts, etc.) are required, the order processor 1010 may direct the payment processor 1006 to generate messages to the backend server to provide data (e.g., amounts, payment source type, card swipe/chip information, etc.) to complete the transactions. Such messages are transmitted via COMMS 1002. The payment processor 1004 may further receive state changes (e.g., "order paid," "payment source 1 approved," "discount amount," etc.) to from the backend server and may provide these state changes to the order processor 1010 via TBUS. The order processor 1010 may then provide those updates to the queue 1021 via OBUS. The terminal 1000 may further be employed to create an order. Accordingly, from order entry data received over DATA, the order processor 1010 may direct the order initiation element 1007 to create an order ID and may also direct the state processor 1020 to create a corresponding order state record 1022 in the queue 1021.

The terminal 1000 terminal according to the present invention is employed to maintain a current state of all orders being fulfilled by the restaurant. The current state of each of the orders is stored in order current state fields 1012 within the order processor 1010. The order processor 1010 may also comprise domain specific rules (not shown), which define actions required to synchronize conflicting order state changes being received and/or processed by the terminal 1000, where the domain specific rules are unique to the restaurant. For example, suppose that one terminal 1000 transmits a state change for a specific order to the backend server, which is acknowledged by the backend server. Concurrently, a second terminal 1000 sends a state change for the same order. The backend server may respond to the second terminal with a message indicating that the order current state field 1012 for the order ID within the second POS terminal 1000 state is out of date (due to connection status) and providing the most recent current state of the order. The domain specific rules are employed by the order processor 1010 within the second terminal 1000 to merge the state changes local to the second terminal 1000 and may store the merged state in the corresponding current state field 1012. The order processor 1010 may then direct the COMMS 1002 to transmit the corresponding (reconciled) state field 1012 contents to the backend server for distribution to all of the terminals 1000 in the restaurant.

Advantageously, the present invention provides for improvements in performance of computational resources within the terminals 1000 over that which has heretofore been provided because the terminal 1000 may be employed to process orders in the absence of network connectivity. In addition, unnecessary communications with the backend server are precluded due to on-board conflict resolution logic (not shown). Moreover, computing performance is increased because the terminal 1000 may be employed to process any of the other orders within the restaurant because the current states of all restaurant orders are resident therein.

The terminal 1000 according to the present invention is configured to perform the functions and operations as discussed above. The terminal 1000 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 1000 may be shared with other circuits, microcode, etc., that are employed to perform other functions and/or operations within the terminal 1000. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The terminal 1000 may be embodied as one or more central processing units (CPUs) that are coupled to transitory and non-transitory storage (i.e., memory), where one or more application programs that are configured to perform the functions discussed above are stored in the non-transitory storage, transferred to the transitory storage at run time, and executed by the one or more CPUs.

Figure 11:
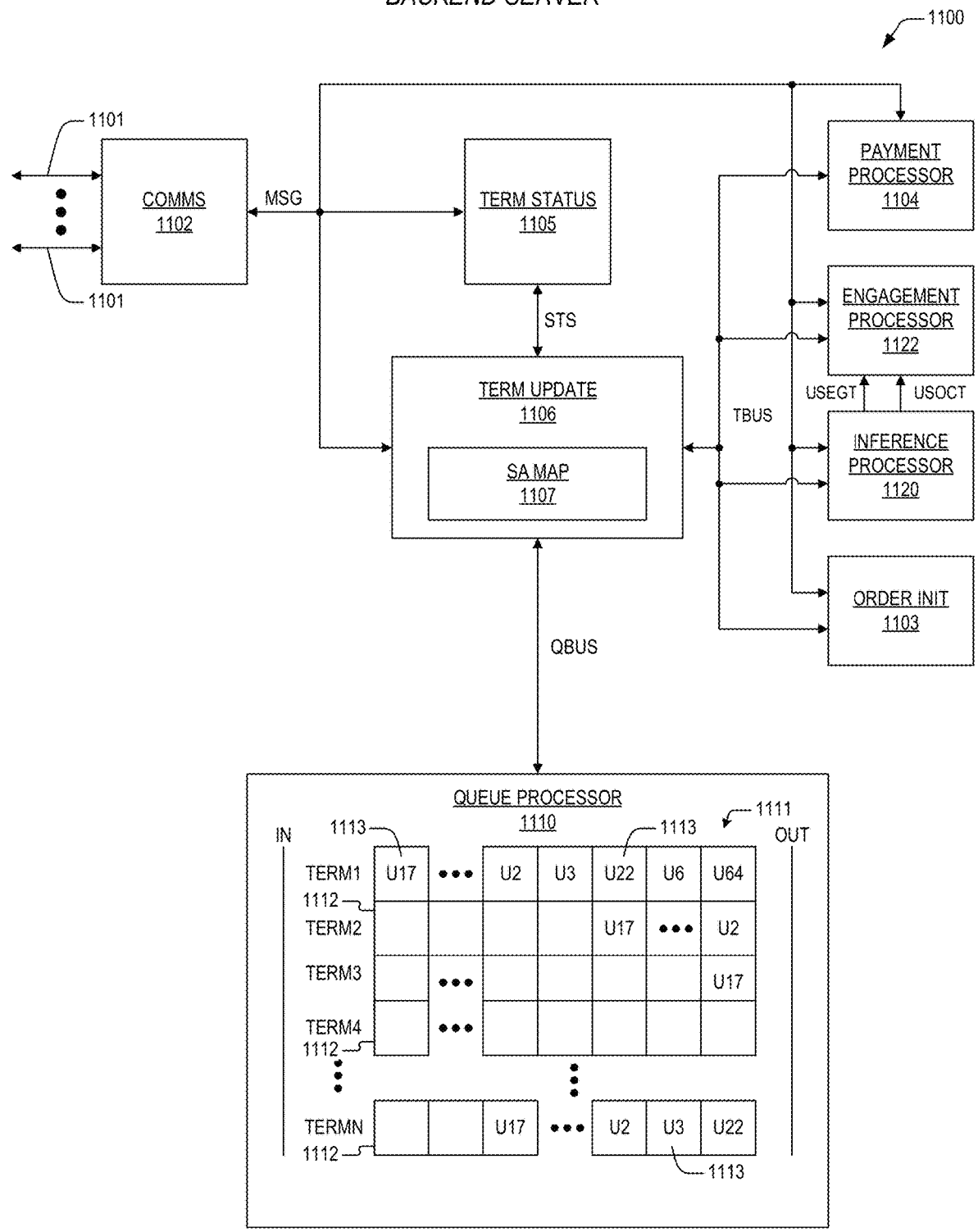
FIG. 11 is a block diagram detailing a backend server according to the present invention that may be employed in the system of FIG. 9.

Now referring to FIG. 11, a block diagram is presented showing a backend server 1100 according to the present invention. The server 1100 may comprise a communications circuit COMMS 1102 (e.g., transceivers, modems, message formatter, etc.) that is coupled to one or more wired or wireless communications links 1101, examples of which are described above with reference to FIGS. 9-10. The server 1100 may also comprise a terminal status element 1105, a terminal update element 1106, a payment processor 1104, a guest inference processor 1120, a patron engagement processor 1122, and an order initiation element 1103, all of which are coupled to COMMS 1102 via a message bus MSG. The terminal status element 1105 is coupled to the terminal update element 1106 via a status bus STS. The guest inference processor 1120 is coupled to the patron engagement processor 1122 via busses USEGT and USOCT. The terminal update element 1106 may comprise a service area map SA MAP 1107. The terminal update element 1106 is coupled to the payment processor 1104, the guest inference processor 1120, the patron engagement processor 1122, and the order initiation element 1103 via a terminal bus TBUS. The terminal update element 1106 is also coupled to a queue processor 1110 via a queue bus QBUS.

The queue processor 1110 may include a durable terminal queue 1111 that includes terminal update records 1112, each of which are associated with a corresponding terminal, such as the terminals 211, 212, 221, 231, 251 discussed with reference to FIG. 9, that are employed within a given restaurant. In the embodiment of FIG. 11, N terminal update records 1112 are shown, each associated with a corresponding one of N terminals for the given restaurant. In a large restaurant or big box environment, N may be roughly equal to 30 terminals, though larger and smaller numbers are contemplated. In one embodiment, an admin console, like the console 271 of FIG. 2, may be designated as a terminal in the queue 1111 for updates and messaging.

Each of the terminal update records 1112 may comprise update fields 1113, which are employed to queue order updates for transmission to each of the corresponding terminals as connectivity to the corresponding terminals permits. Update fields 1113 nearest to OUT are the oldest order updates queued for transmission to the corresponding terminals. Update fields 1113 nearest to IN are youngest (or most recent) order updates queued for transmission to the corresponding terminals. Fields 1113 between the oldest order updates and the youngest order updates descend in age from oldest to youngest update according to when those updates are received from others of the corresponding terminals.

Values of the order update fields 1113 may include, but are not limited to, an order ID along with order details, including payment information, taken by the others of the corresponding terminals. Accordingly, the terminal update record 1112 for terminal 1 TERM1 depicts a plurality of order update fields 1113 to be transmitted to TERM1 when connectivity is reestablished with TERM1. In decreasing age from oldest to youngest order update, the fields 1113 depict updates to order 64 U64, then order 6 U6, then order 22 U22, and so on, culminating with an update to order 17 U17. As one skilled in the art will appreciate, the terminal update record 1112 for TERM1 is indicative that TERM1 has been offline (i.e., no connectivity) longer than any of the other terminals in the restaurant. This length of time may correspond to a mobile terminal that is serving a party on a restaurant porch that has poor Wi-Fi connectivity, or may correspond to a delivery terminal that is traversing an area with poor cellular coverage. The terminal update records 1112 corresponding to TERM2, TERM3, and TERMN depict a number of populated order update fields 1113 less than the number of fields for TERM1, which may correspond to terminals within the restaurant that have only slightly intermittent connectivity. And the terminal update record for TERM4 contains only empty order update fields 1113, thus indicating that this terminal is up to date on all order state changes within the restaurant.

Operationally, the terminal status element 1105 may periodically transmit a first message to each of the terminals and update the connectivity status of the terminals based upon whether they acknowledge the first message or not. In one embodiment, the first message may comprise a ping message. In one embodiment, acknowledgment may comprise a simple acknowledge message. In other embodiments, acknowledgement may comprise additional data such as received signal strength indication RSSI, number of hops, or Global Positioning System (GPS) coordinates. The acknowledge message may further comprise configuration identification data such as terminal configuration (e.g., mobile order entry, order processing, kiosk, management terminal).

The terminal status element 1105 may provide connectivity status of each of the terminals to the terminal update element 1106 via bus STS. The service area map 1107 is a table that associates each of the terminals to one or more service areas within the restaurant, as described above with reference to FIG. 9. In one embodiment, the terminal update element 1106 may generate order update messages from oldest to youngest update for each of the terminals that are connected. Connectivity is maintained when a terminal acknowledges receipt of an order update message. Once acknowledged, the terminal update element 1106 directs the queue processor 1110 to delete the oldest order update for that terminal and shift pending order updates so that the next oldest order update becomes the oldest order update. In one embodiment, order updates are transmitted to a given terminal until its terminal update record 1112 is empty, or until connectivity is broken.

In one embodiment, all of the terminals associated with the restaurant are updated by the terminal update element 1106. In an alternative embodiment, terminals are selectively updated in accordance with their mapping to the one or more service areas, as indicated by contents of the service area map 1107. For example, delivery terminals may only require knowledge of orders that are to be delivered outside the restaurant, and thus they may be mapped to a "delivery" service area so that order updates that correspond to the delivery service area are transmitted to the delivery terminals. Similarly, the restaurant or retail establishment may be so large that management dedicates certain terminals to designate service areas. Accordingly, all of the terminals in a given service area may be employed to update any order placed within the given service area, but they may not be employed to update orders placed outside of the given service area. In like fashion, the service area map 1107 may designate one or more of the terminals as an owner terminal operating in an owner mode, and may selectively update the owner terminals with information and messages that comport with management and finance of the restaurant, as is described above.

Messages received from the communications circuit 1102 may also require additional functions to be performed by the backend server 1100. For example, when orders are placed by a browser-based, first-party based, or third-party based terminal, the terminal update element 1106 may transmit the order update to the order initiation element 1103 via TBUS. The order initiation element 1103 may then create an order ID for the order update and may assign the order ID to one or more of the terminals within the restaurant. Similarly, when an order update message received over the COMMS 1102 requires processing of transactions outside of the terminals' capabilities (e.g., financial transactions with credit card providers, loyalty card discounts, etc.), the payment processor 1104 may generate messages to complete the transactions and the messages are transmitted via COMMS 1102. The payment processor 1104 may further generate order updates (e.g., "order paid," "payment source 1 approved," "discount amount," etc.) to be transmitted to the terminals and may provide these updates to the terminal update element 1106 via TBUS. The terminal update element 1106 may then provide those updates to the durable queue 1111 via QBUS, and the updates are transmitted to the POS terminals in due course dependent upon connection status, as is described above.

Messages received over COMMS 1102 may also comprise images transmitted via facial recognition cameras and PII provided by first-party apps which have been awakened by transmissions received from on-site low-power Bluetooth beacons. Accordingly, the guest inference processor 1120 may monitor these messages all other messages related to orders to extract and analyze PII resulting in designating unique UGRs related to orders, having functionality substantially similar to the guest inference processor 201 discussed with reference to FIG. 2, the differences being that direct inputs, first-party inputs, and third-party inputs are received as messages over COMMS 1102. As discussed above, the inference processor 1120 may further access segmentation records and social graph records related to orders and provide these records to the patron engagement processor 1122 via buses USEGT and USOCT, respectively, as described above with references to FIG. 2.

The patron engagement processor 1122 may monitor messages received over MSG and states of orders via TBUS and may generate upsell, cross-sell, and patron engagement content for display to corresponding terminals (fixed, mobile, browser-based, first-party, third-party, and delivery) based upon segmentation records and social graph records provided by the guest inference processor 1120 via buses USEGT and USOCT. This content may be also transmitted to the terminals via messages over MSG.

The backend server 1100 according to the present invention is configured to perform the functions and operations as discussed above. The server 1100 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the server 1100 may be shared with other circuits, microcode, etc., that are employed to perform other functions and/or operations within the server 1100. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The backend server 1100 may be embodied as one or more central processing units (CPUs) that are coupled to both transitory and non-transitory storage (i.e., memory), where one or more application programs that are configured to perform the server functions discussed above are stored in the non-transitory storage, transferred to the transitory storage at run time, and executed by the one or more CPUs.

Figure 12:
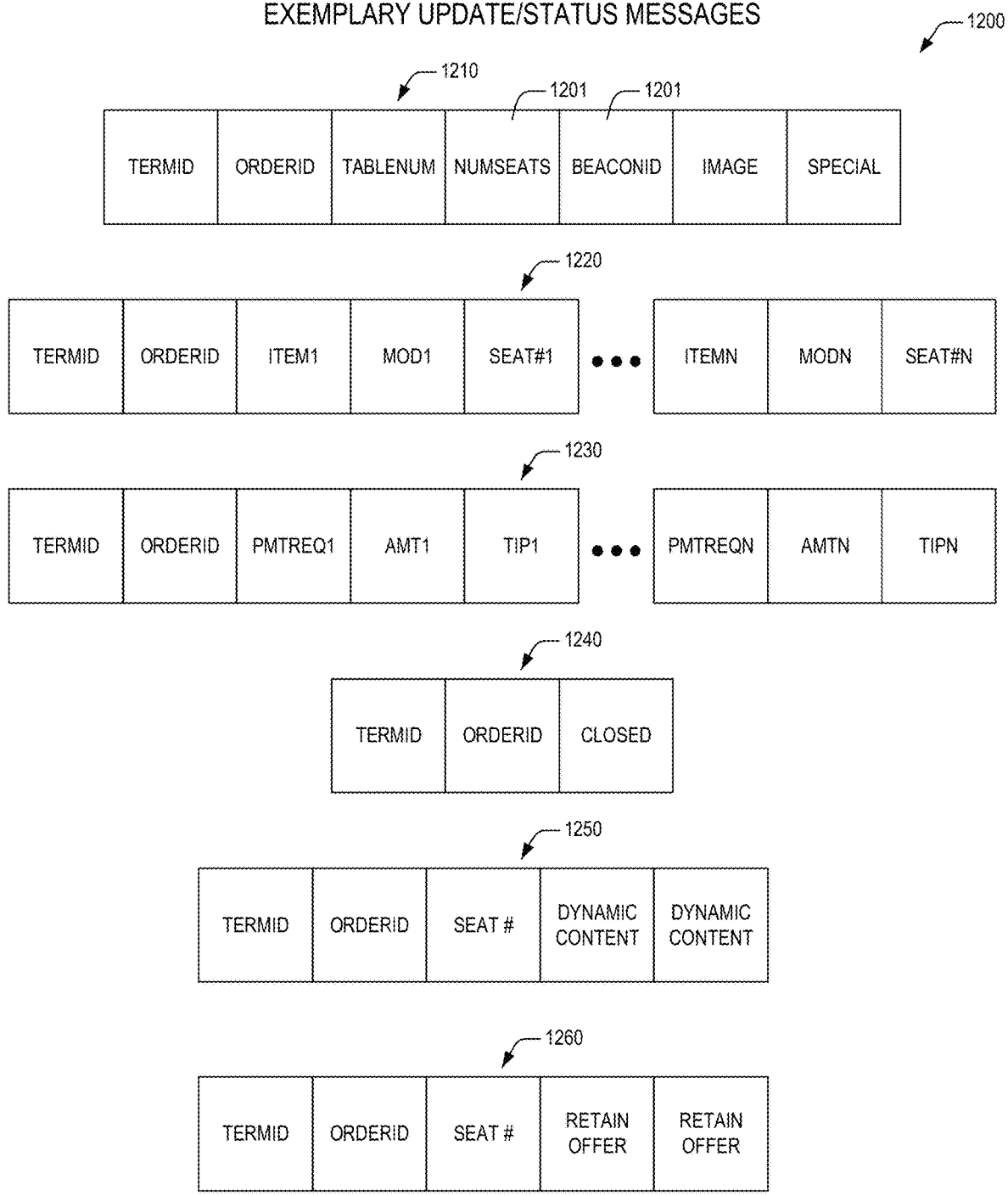
FIG. 12 is a diagram depicting exemplary update/status messages according to the present invention that may be employed in the system of FIG. 9.

Now turning to FIG. 12, a block diagram 1200 is presented illustrating exemplary update/status messages according to the present invention that flow between a backend server and a POS terminal.

An order assignment message 1210 transmitted by the backend server to one or more POS terminals may comprise fields 1201 having a specific terminal ID TERMID assigned for a particular order ID ORDERID along with a table number TABLENUM having a given number of seats NUMSEATS. The message 1210 may further comprise a BEACONID field 1201 that contains a patron identifier that corresponds to a previously received first-party application response to a low-power Bluetooth beacon string. The message 1210 may moreover comprise IMAGE fields that contain patron identifiers that correspond to previously received images from on-site facial recognition cameras.

An order state change message 1220 transmitted from a POS terminal to the server may comprise TERMID and ORDERID fields 1201 as described above, along with one or more groups of ITEM, MOD, and SEAT # fields 1201, where contents of the ITEM field 1201 indicated a menu item ordered for a given seat number at the table along with any modifications to the item number (e.g., rare, no onions, etc.).

A payment state change message 1230 transmitted from a POS terminal to the server may comprise TERMID and ORDERID fields along with one or more groups of PMTREQ, AMT, and TIP fields 1201, where contents of the PMTREQ field 1201 indicate a payment type (e.g., cash, MasterCard, etc.), and contents of AMT and TIP indicate amount of payment for the particular payment type along with a tip amount.

An order closeout message 1240 may comprise TERMID and ORDER ID fields 1201 as noted above, along with a CLOSED field 1201, the contents of which indicate whether the particular order ID is open or closed.

An upsell/cross-sell message 1250 transmitted by the backend server to a POS terminal may comprise a TERMID field 1201 as noted above along with ORDERID, SEAT #, and one or more dynamic content fields, where the dynamic content fields provide digital content for display on the terminal that may be communicated to the patron corresponding to the value of SEAT # by wait staff for purposes of upsell or cross-sell. In the case that the TERMID field corresponds to a kiosk, the dynamic content fields provide digital content for display to the patron along with a message indicating that the patron may want to upgrade to the indicated items.

An patron retention message 1250 transmitted by the backend server to a POS terminal may comprise a TERMID field 1201 as noted above along with ORDERID, SEAT #, and one or more retention offer fields, where the retention offer fields provide digital content for display on the terminal that may be communicated to the patron corresponding to the value of SEAT # by wait staff for purposes of retaining loyalty and frequency of purchases. In the case that the TERMID field corresponds to a kiosk, the dynamic content fields provide digital content for display to the patron along with a message indicating that the patron may select one or more of the provided retention offers.

The messages 1210, 1220, 1230, 1240, 1250, 1260 are not exhaustive of those what may be employed according to the present disclosure but are provided herein to teach further aspects and advantages according to the present invention.

Figure 13:
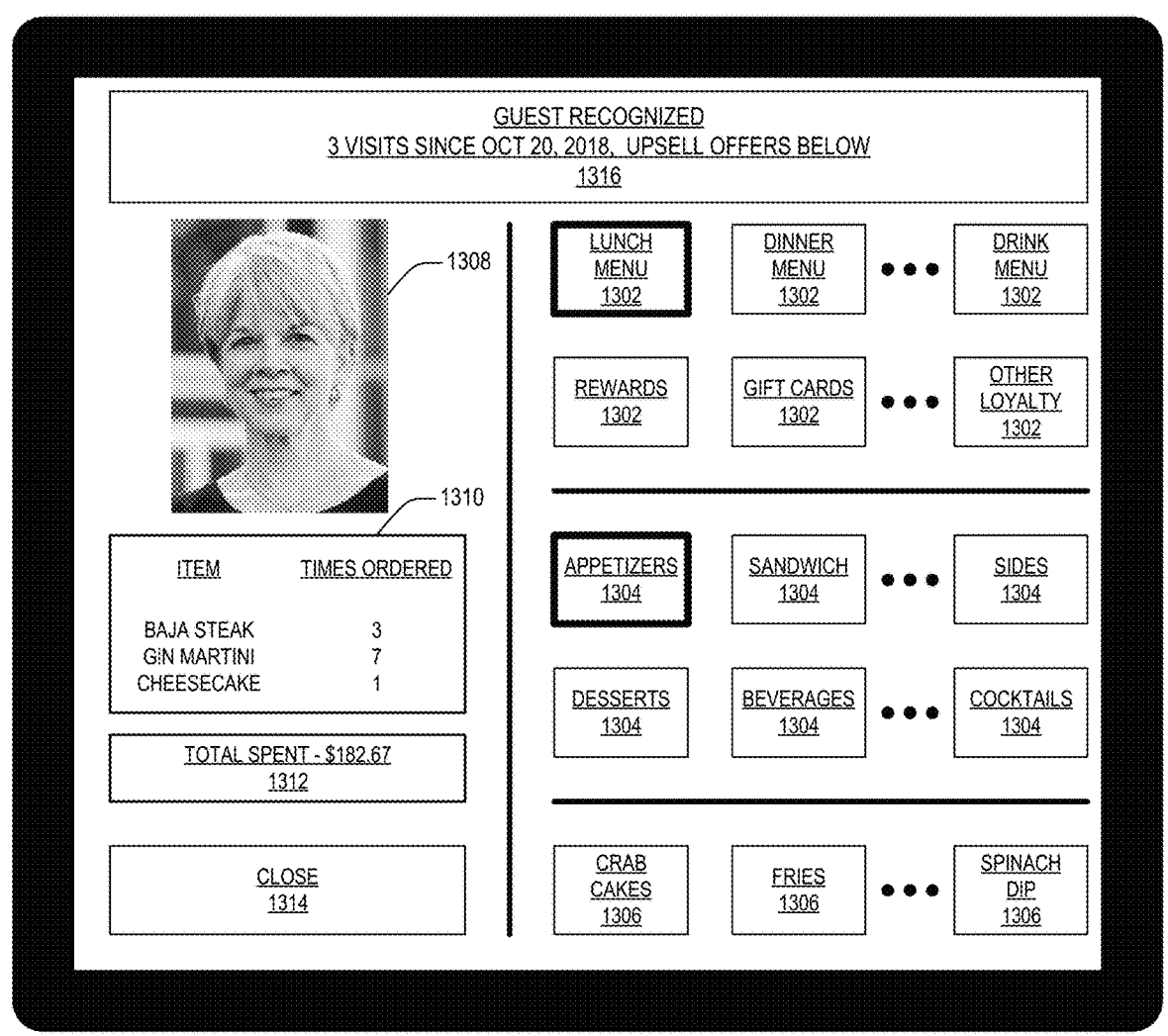
FIG. 13 is a diagram featuring an exemplary upsell offers display on a point-of-sale terminal according to the present invention.

Turning now to FIG. 13, a diagram is presented featuring an exemplary upsell offers display 1300 on a point-of-sale terminal according to the present invention. The display 1300 is representative of that shown via a touchpad display as part of an in-restaurant POS terminal, a delivery terminal, or a browser-based terminal that may be used to place an order for goods. The display 1300 has a plurality of primary icons 1302 which, when touched, result in display of a plurality of secondary icons 1304. As shown, a highlighted LUNCH MENU icon 1302 has been pressed, which results in the display of lunch menu icons 1304 that include APPETIZERS, SANDWICH, SIDES, DESSERTS, etc. Pressing one of the secondary icons 1304 results in display of a plurality of tertiary icons 906. As also shown, a highlighted APPETIZERS icon 1304 has been pressed, which results in the display of appetizer icons 1306 that include, CRAB CAKES, FRIES, SPINACH DIP, etc., which are ranked in order of display to provide for effective upsell to the patron. Via this exemplary hierarchical menu scheme, wait staff (via fixed or mobile terminals), the patron (via a kiosk or browser-based terminal, or delivery staff (via a delivery terminal) may present menu items for upsell/cross-sell to the recognized patron that are ranked by an engagement processor on the backend server according to algorithms executed thereon that utilize UGR segments for patrons in order to increase check size with a greater likelihood than that which has heretofore been provided.

The display 1300 also has a registered image field 1308 that presents an image of the patron captured by an in-restaurant facial recognition camera or that is provided by the backend server as a result of identification of the patron via an in-restaurant low-power Bluetooth beacon. The display 1300 further includes an alert field 1316 that provides a prompt to wait staff that the patron has been recognized by the system along with number of recent visits and alert of an upsell/cross-sell opportunity.

The display 1300 has an order history field 1310 that shows previous patron orders including number of times ordered at this restaurant. The display 1300 also has a TOTAL SPENT icon 1312 that provides an indication to wait staff of the long-term value of the recognized patron. One advantage of the present invention is illustrated within the display 1300. Note that the order history field 1310 shows that the patron corresponding to a resolved UGR has previously ordered a beef entrée, a cocktail, and a dessert; however, the upsell/cross-sell offer area items 1306 provide for a crab cake appetizer as a first option. Such an option does not logically follow from the displayed order history 1310. Yet, as discussed above, the guest inference processor according to the present invention is configured to analyze a recognized UGR's previous orders across all restaurants that subscribe to the POS service—tens of thousands of restaurants. In this instance, based on previous orders at other restaurants, the guest inference processor has indicated a segment value that this particular patron has a substantial proclivity to order seafood appetizers, and thus crab cakes are provided as a first option for upsell. The display 1300 further has a CLOSE icon 1314 which, when pressed will attempt to close out the corresponding order.

The display 1300 shown in FIG. 13 is a very simple example of how a recognized patron corresponding to a UGR may be presented with options to enable the restaurant to increase check size, where the options have a substantial probability of being accepted by the patron.

Digital content on displays for smart devices executing a first-party application is similarly modified for upsell/cross-sell purposes. Digital content on displays for smart devices executing a third-party application is modified subject to the third-party application's functionality; however, suggested upsell/cross-sell items are presented to the third-party application via the API.

Figure 14:
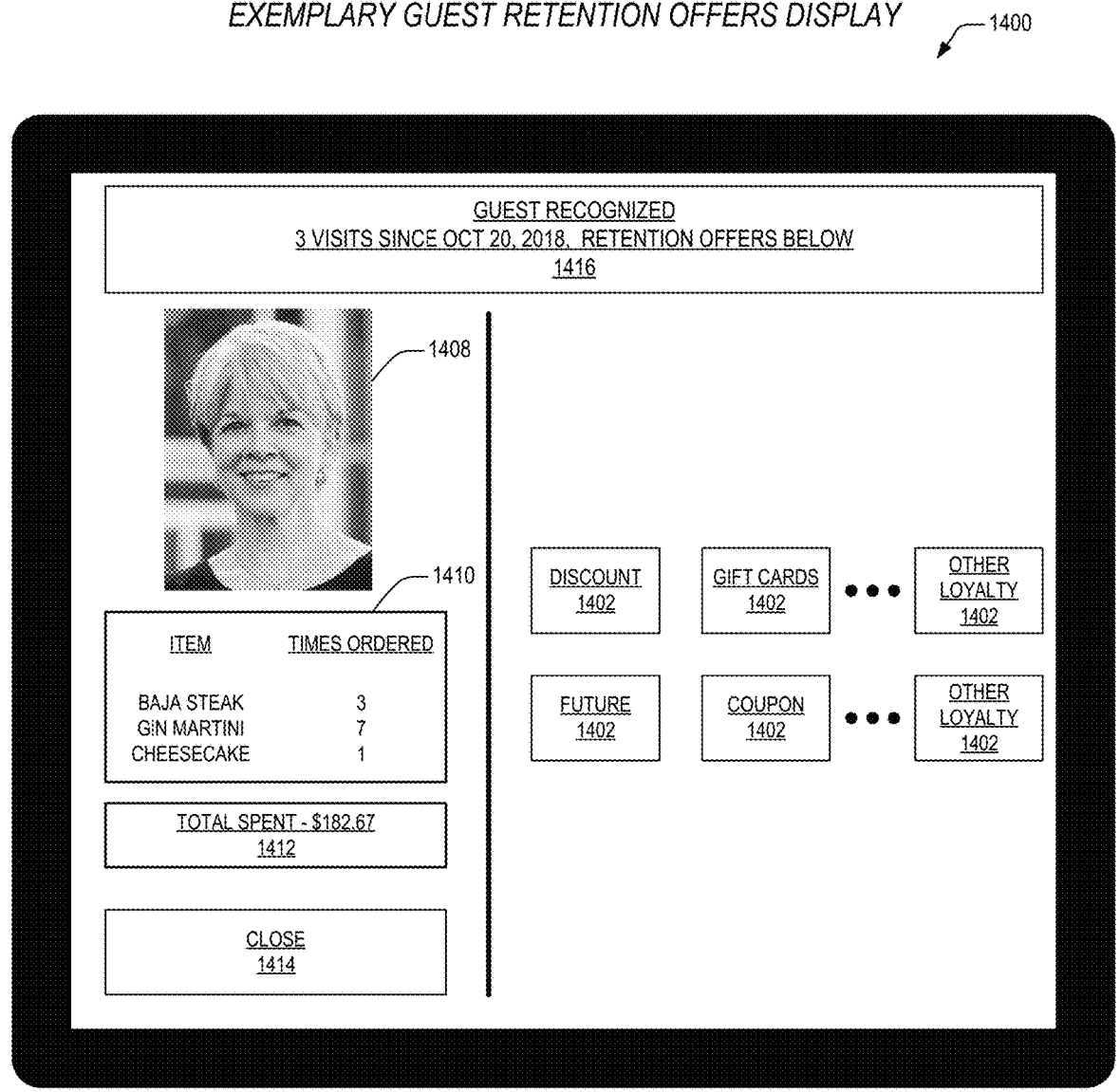
FIG. 14 is a diagram showing an exemplary guest retention offers display on a point-of-sale terminal according to the present invention.

Now referring to FIG. 14, a diagram is presented showing an exemplary guest retention offers display 1400 on a point-of-sale terminal according to the present invention. The display 1400 is representative of that shown via a touchpad display as part of an in-restaurant POS terminal, a delivery terminal, or a browser-based terminal that may be used to place an order for goods, present options for upsell and cross-sell, and payment for the ordered goods. The display 1400 has a plurality of guest retention icons 1402 which, when touched, may be transferred to a patron corresponding to a recognized UGR as discussed above. The guest retention icons 1402 are ranked in order of display to provide for a maximized likelihood of offer acceptance by the patron. Via this scheme, wait staff (via fixed or mobile terminals), the patron (via a kiosk or browser-based terminal, or delivery staff (via a delivery terminal) may present guest retention and loyalty offers to the recognized patron that are ranked by an engagement processor on the backend server according to algorithms executed thereon that utilize UGR segments for patrons in order to increase patron loyalty to the restaurant with a greater likelihood than that which has heretofore been provided.

The display 1400 also has a registered image field 1408 that presents an image of the patron captured by an in-restaurant facial recognition camera or that is provided by the backend server as a result of identification of the patron via an in-restaurant low-power Bluetooth beacon. The display 1400 further includes an alert field 1416 that provides a prompt to wait staff that the patron has been recognized by the system along with number of recent visits and alert of a guest retention opportunity.

The display 1400 has an order history field 1410 that shows previous patron orders including number of times ordered at this restaurant. The display 1400 also has a TOTAL SPENT icon 1412 that provides an indication to wait staff of the long-term value of the recognized patron. Another advantage of the present invention is illustrated within the display 1400. Note that the order history field 1410 shows that the patron corresponding to a resolved UGR has previously ordered a beef entrée, a cocktail, and a dessert, and the guest retention offer area items 1402 provide a discount as a first option. This results from analysis by the guest inference processor according to the present invention that is configured to analyze a recognized UGR's previous orders across all restaurants that subscribe to the POS service. In this instance, based on previous orders and payments at other restaurants, the guest inference processor has indicated a segment value that this particular patron has a substantial inclination to utilize discounts as a form of payment over other types of retention offers. The display 1400 further has a CLOSE icon 1414 which, when pressed will attempt to close out the corresponding order.

The display 1400 shown in FIG. 1400 is a very simple example of how a recognized patron corresponding to a UGR may be presented with options to enable the restaurant to retain patron loyalty, where the options have a substantial probability of being accepted by the patron.

Digital content on displays for smart devices executing a first-party application is similarly modified for guest retention purposes. Digital content on displays for smart devices executing a third-party application is modified subject to the third-party application's functionality; however, suggested guest retention mechanisms are presented to the third-party application via the API.

Advantageously, the present invention provides superior techniques for identifying and engaging patrons because, in contrast to present-day engagement methods, direct POS data is employed to not only identify patrons, but also to generate portfolios of a patron's tastes, spending habits, and tendencies. In some cases, a patron may be identified based solely on what they order and when the order is placed.

In a restaurant environment, more robust and accurate guest portfolios may be generated that not only include items ordered and spending habits, but also time spent in given restaurants along with social network connections for dining. Further accurate and effective portfolios are generated based not only on a patron's orders and spending at a single restaurant or chain, but across all restaurants—tens of thousands—that are subscribers to the cloud-based restaurant POS service as has been disclosed herein.

One advantage of the present invention is that aggregate insight to visiting guests' taste profiles to a restaurant establishment can be determined so that the restaurant can evolve and change the menu based on this information.

Another advantage of the present invention is that a guest based on input information before a purchase has been completed in order to upsell and suggest menu items of interest based on the guest's entire taste profile, where the taste profile is not limited to a single location or chain of locations. For example, a kiosk self-service POS could be employed to customize the menu display that appeals directly to the guest.

A further advantage of the present invention is that a technique is provided to shift food order demands at subscribing restaurants to off-peak hours, since the POS system according to the present invention would have previously transformed the subscribing restaurants' corresponding data sets to determine guest purchasing behavior and rush hours that are specific to each subscribing restaurant. Accordingly, purchasing habits and taste preferences of guests may be aggregated and food orders accepted in such way to allow restaurants to prepare the food in bulk, thus enabling their respective kitchens to operate with higher efficiency while maintaining food quality and food preparation timeliness. Higher efficiency and timeliness consequently result in greater revenue for subscribing restaurants along with a better experience for guests, thus increasing guest return rates.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A system for multi-channel patron identification comprising:

one or more low power Bluetooth beacons, configured to wake up a first-party application executing on smart devices of a plurality of patrons, when said smart devices are within a proximity of an establishment, and configured to access personally identifiable information (PII) from said smart devices within the establishment;

one or more facial recognition cameras configured to capture images of the plurality of patrons and send the captured images to a backend server;

one or more processors, configured to:

correlate the received images to both registered and unregistered patrons to identify universal quest records corresponding to the plurality of patrons;

receive, via computing buses, inputs, from multiple input channels comprising transaction data corresponding to the plurality of patrons, wherein a portion of said transaction data comprises metadata from which said PII is inferred;

analyze and group, said transaction data for transactions corresponding to the universal quest records that are close together in time of day and geolocation proximity as determined by Bluetooth triangulation;

extract said PII from said portion of said transaction data using deterministic search techniques to identify and segregate pieces of said PII associated with a transaction key stored in a transaction key field corresponding to a unique identifier associated with contents of transaction data fields;

correlate, using statistical techniques, the PII identified in frames having different values of the transaction key field, to determine two or more of the frames having a same transaction;

aggregate all of the transaction data fields within a single frame having a single transaction key field value;

disambiguate the universal quest records of two or more of the plurality of patrons corresponding to the pieces of said PII into a single patron record by initiating on a disjoint subgraph defined by a group of connected nodes without edges connecting to any other nodes, each unique PII element as a first node having edges with weight values equal to a number of the transactions containing the first node and the other nodes, and by dropping any node greater than a first prescribed number of edges as an outlier, and by also dropping, for any user subgraph with greater than a second prescribed number of nodes, a subgraph member node with a greatest number of edqes compared to all remaining subgraph member nodes;

analyze said PII transaction data and said metadata referring to the single patron record to generate a single universal guest record (UGR) of a single patron comprising UGR transaction metadata corresponding to said transaction data and historical transactions associated with the single patron; and upon identification of the single patron, receive said single universal guest record (UGR) to generate content for display on point-of-sale (POS) terminals associated with the establishment, and direct said POS terminals to display said content.

2. The system as recited in claim 1, wherein said multiple input channels comprise:
   a direct input channel, wherein said inputs are entered via an input source to a point-of-sale (POS) system;
   a first-party input channel, wherein said inputs are entered via the first-party application of one of said smart devices that is operably coupled to said POS system; and
   a third-party input channel, wherein said inputs are entered via an application programming interface (API) that is operably coupled to said POS system,
      whereby a third-party application executing on another one of the smart devices is enabled to place orders via said API.

3. The system as recited in claim 1, wherein the one or more processors are further configured to identify segments corresponding to the single patron, wherein specific contents of said segment fields are indicative of tastes, timing, spending habits, and predispositions of the single patron.

4. The system as recited in claim 3, wherein said segments comprise type of product routinely purchased, long-term spending amount, average check size, number of successful upsells, expected purchase seasons, restaurant preferences, alcohol purchases, and geolocations of all POS system subscriber businesses from which the single patron has placed orders.

5. The system as recited in claim 1, wherein the one or more processors are configured to employ statistical algorithms to analyze said Pii transaction data and said metadata to generate said single universal guest record.

6. The system as recited in claim 5, wherein the one or more processors are further configured to additionally employ said Pii transaction data to access additional associated Pii stored in historical transaction records of the historical transactions.

7. A method for multi-channel patron identification comprising:
   waking up, by one or more low power Bluetooth beacons, a first-party application executing on smart devices of a plurality of patrons, when said smart devices are within a proximity of an establishment, and configured to access personally identifiable information (PII) from said smart devices within the establishment;
   capturing, by one or more facial recognition cameras, images of the plurality of patrons to be sent to a backend server;
   correlating, by one or more processors, the received images to both registered and unregistered patrons to identify universal guest records corresponding to the plurality of patrons;
   receiving, by the one or more processors via computing buses, inputs, from multiple input channels comprising transaction data corresponding to the plurality of patrons, wherein a portion of said transaction data comprises metadata from which said PII is inferred;
   analyzing and grouping, by the one or more processors, said transaction data for transactions corresponding to the universal guest records that are close together in time of day and geolocation proximity as determined by Bluetooth triangulation;
   extracting, by the one or more processors, said PII from said portion of said transaction data using deterministic search techniques to identify and segregate pieces of said PII associated with a transaction key stored in a transaction key field corresponding to a unique identifier associated with contents of transaction data fields;
   correlating, by the one or more processors using statistical techniques, the PII identified in frames having different values of the transaction key field, to determine two or more of the frames having a same transaction;
   aggregating, by the one or more processors, all of the transaction data fields within a single frame having a single transaction key field value;
   disambiguating, by the one or more processors, the universal guest records of two or more of the plurality of patrons corresponding to the pieces of said PII into a single patron record by initiating on a disjoint subgraph defined by a group of connected nodes without edges connecting to any other nodes, each unique PII element as a first node having edges with weight values equal to a number of the transactions containing the first node and the other nodes, and by dropping any node greater than a first prescribed number of edges as an outlier, and by also dropping, for any user subgraph with greater than a second prescribed number of nodes, a subgraph member node with a greatest number of edges compared to all remaining subgraph member nodes;
   analyzing, by the one or more processors, said PII transaction data and said metadata referring to the single patron record to generate a single universal guest record (UGR) of a single patron comprising UGR transaction metadata corresponding to said transaction data and historical transactions associated with the single patron; and
   upon identification of the single patron, receiving, by the one or more processors, said single universal guest record (UGR) to generate content for display on point-of-sale (POS) terminals associated with the establishment, and direct said POS terminals to display said content.

8. The method as recited in claim 7, wherein said multiple input channels comprise:
   a direct input channel, wherein said inputs are entered via an input source to a point-of-sale (POS) system;
   a first-party input channel, wherein said inputs are entered via the first-party application of one of said smart devices that is operably coupled to said POS system; and
   a third-party input channel, wherein said inputs are entered via an application programming interface (API) that is operably coupled to said POS system,
      whereby a third-party application executing on another one of the smart devices is enabled to place orders via said API.

9. The method as recited in claim 7, further comprising:
   identifying, by the one or more processors, segments corresponding to the single patron, wherein specific contents of said segment fields are indicative of tastes, timing, spending habits, and predispositions of the single patron.

10. The method as recited in claim 9, wherein said segments comprise type of product routinely purchased, long-term spending amount, average check size, number of successful upsells, expected purchase seasons, restaurant preferences, alcohol purchases, and geolocations of all POS system subscriber businesses from which the single patron has placed orders.

11. The method as recited in claim 7, further comprising employing statistical algorithms, by the one or more processors, to analyze said Pii transaction data and said metadata to generate said single universal guest record.

12. The method as recited in claim 11, further comprising additionally employing, by the one or more processors, said Pii transaction data to access additional associated Pii stored in historical transaction records of the historical transactions.

13. A non-transitory computer readable storage medium storing instructions comprising:
  waking up, by one or more low power Bluetooth beacons, a first-party application executing on smart devices of a plurality of patrons, when said smart devices are within a proximity of an establishment, and configured to access personally identifiable information (PII) from said smart devices within the establishment;
  capturing, by one or more facial recognition cameras, images of the plurality of patrons to be sent to a backend server;
  correlating, by one or more processors, the received images to both registered and unregistered patrons to identify universal guest records corresponding to the plurality of patrons;
  receiving, by the one or more processors via computing buses, inputs, from multiple input channels comprising transaction data corresponding to the plurality of patrons, wherein a portion of said transaction data comprises metadata from which said PII is inferred;
  analyzing and grouping, by the one or more processors, said transaction data for transactions corresponding to the universal guest records that are close together in time of day and geolocation proximity as determined by Bluetooth triangulation;
  extracting, by the one or more processors, said PII from said portion of said transaction data using deterministic search techniques to identify and segregate pieces of said PII associated with a transaction key stored in a transaction key field corresponding to a unique identifier associated with contents of transaction data fields;
  correlating, by the one or more processors using statistical techniques, the PII identified in frames having different values of the transaction key field, to determine two or more of the frames having a same transaction;
  aggregating, by the one or more processors, all of the transaction data fields within a single frame having a single transaction key field value;
  disambiguating, by the one or more processors, the universal guest records of two or more of the plurality of patrons corresponding to the pieces of said PII into a single patron record by initiating on a disjoint subgraph defined by a group of connected nodes without edges connecting to any other nodes, each unique PII element as a first node having edges with weight values equal to a number of the transactions containing the first node and the other nodes, and by dropping any node greater than a first prescribed number of edges as an outlier, and by also dropping, for any user subgraph with greater than a second prescribed number of nodes, a subgraph member node with a greatest number of edges compared to all remaining subgraph member nodes;
  analyzing, by the one or more processors, said PII transaction data and said metadata referring to the single patron record to generate a single universal guest record (UGR) of a single patron comprising UGR transaction metadata corresponding to said transaction data and historical transactions associated with the single patron; and
  upon identification of the single patron, receiving, by the one or more processors, said single universal guest record (UGR) to generate content for display on point-of-sale (POS) terminals associated with the establishment, and direct said POS terminals to display said content.

14. The non-transitory computer readable storage medium as recited in claim 13, wherein said multiple input channels comprise:
  a direct input channel, wherein said inputs are entered via an input source to a point-of-sale (POS) system;
  a first-party input channel, wherein said inputs are entered via the first-party application of one of said smart devices that is operably coupled to said POS system; and
  a third-party input channel, wherein said inputs are entered via an application programming interface (API) that is operably coupled to said POS system,
  whereby a third-party application executing on another one of the smart device is enabled to place orders via said API.

15. The non-transitory computer readable storage medium as recited in claim 13, wherein the instructions further comprise:
  identifying, by the one or more processors, segments corresponding to the single patron, wherein specific contents of said segment fields are indicative of tastes, timing, spending habits, and predispositions of the single patron.

16. The non-transitory computer readable storage medium as recited in claim 15, wherein said segments comprise type of product routinely purchased, long-term spending amount, average check size, number of successful upsells, expected purchase seasons, restaurant preferences, alcohol purchases, and geolocations of all POS system subscriber businesses from which the single patron has placed orders.

17. The non-transitory computer readable storage medium as recited in claim 13, wherein the instructions further comprise:
  employing statistical algorithms, by the one or more processors, to analyze said Pii transaction data and said metadata to generate said single universal guest record.

18. The non-transitory computer readable storage medium as recited in claim 17, wherein the instructions further comprise:
  additionally employing, by the one or more processors, said Pii transaction data to access additional associated Pii stored in historical transaction records of the historical transactions.

* * * * *